(12) United States Patent
Ohya

(10) Patent No.: US 9,019,403 B2
(45) Date of Patent: Apr. 28, 2015

(54) LENS BARREL

(71) Applicant: Takahiro Ohya, Yokohama (JP)

(72) Inventor: Takahiro Ohya, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 90 days.

(21) Appl. No.: 14/011,908

(22) Filed: Aug. 28, 2013

(65) Prior Publication Data

US 2014/0063296 A1 Mar. 6, 2014

(30) Foreign Application Priority Data

Aug. 31, 2012 (JP) ................................. 2012-191405

(51) Int. Cl.
*H04N 5/262* (2006.01)
*G02B 7/02* (2006.01)
*G02B 7/04* (2006.01)
*H04N 5/232* (2006.01)
*G02B 7/10* (2006.01)

(52) U.S. Cl.
CPC .............. *G02B 7/04* (2013.01); *H04N 5/23296* (2013.01); *G02B 7/102* (2013.01)

(58) Field of Classification Search
CPC ............ G02B 7/10; G02B 7/102; G02B 7/04; G02B 7/14; G03B 5/00; G03B 2205/0007; H04N 5/2254; H04N 5/23296
USPC ................. 348/240.3; 359/819, 823, 694–705
See application file for complete search history.

(56) References Cited

U.S. PATENT DOCUMENTS

| | | | | |
|---|---|---|---|---|
| 6,639,730 B2 * | 10/2003 | Muto et al. | ..................... | 359/694 |
| 7,580,623 B2 * | 8/2009 | Nuno et al. | ..................... | 396/73 |
| 2001/0024573 A1 * | 9/2001 | Nomura et al. | ............... | 396/448 |
| 2003/0072089 A1 * | 4/2003 | Yasutomi | ...................... | 359/701 |
| 2004/0228006 A1 * | 11/2004 | Yasutomi et al. | ............. | 359/699 |
| 2006/0056078 A1 | 3/2006 | Nomura et al. | | |
| 2008/0310035 A1 * | 12/2008 | Kato | .............................. | 359/817 |
| 2010/0046089 A1 | 2/2010 | Iwasaki | | |
| 2011/0128634 A1 | 6/2011 | Iwasaki | | |
| 2011/0273786 A1 * | 11/2011 | Ooya | ............................. | 359/817 |
| 2012/0002307 A1 | 1/2012 | Ooya et al. | | |
| 2012/0300314 A1 | 11/2012 | Ooya | | |
| 2012/0307385 A1 * | 12/2012 | Mitani | .......................... | 359/824 |

FOREIGN PATENT DOCUMENTS

| | | |
|---|---|---|
| JP | 2006-071844 | 3/2006 |
| JP | 2008-262075 | 10/2008 |

* cited by examiner

*Primary Examiner* — James Hannett
*Assistant Examiner* — Padma Haliyur
(74) *Attorney, Agent, or Firm* — Oblon, McClelland, Maier & Neustadt, L.L.P.

(57) ABSTRACT

A lens barrel includes a lens retaining member retaining a lens group and having a retaining-side cam follower, a moving member being movable in an optical axis direction with respect to the lens retaining member and having a moving-side cam follower, a rotary barrel having a retaining-side cam groove and a moving-side cam groove and being configured to rotate, thereby giving the lens retaining member and the moving member moving force; an elastic member giving the lens retaining member and the moving member relatively pushing force in the optical axis direction, and a rotating load restraining mechanism retaining rotating load of the rotary barrel generated by the pushing force. The rotating load restraining mechanism includes the moving-side cam groove provided such that the angle made by the part on which the moving-side cam follower abuts and the plane orthogonal to the optical axis becomes small, in a sharply inclined area.

10 Claims, 10 Drawing Sheets

LENS BARREL

CROSS REFERENCE TO RELATED APPLICATION

The present application claims priority to Japanese Patent Application No. 2012-191405 filed Aug. 31, 2012 to the Japan Patent Office, the entire content of which is incorporated herein by reference in its entirety.

BACKGROUND OF THE INVENTION

1. Field of the Invention

The present invention relates to a lens barrel which enables a lens group to move in an optical axis direction.

2. Description of the Related Art

In imaging apparatuses such as a digital camera, a lens barrel has been known in which a cam follower is provided on a peripheral surface of a lens retaining member for retaining a lens group, and is inserted into a cam groove provided on a peripheral surface of a rotary barrel. This lens barrel is configured such that the lens retaining member, that is, the lens group held therein, is moved in a photographing optical axis direction by rotation of the rotary barrel by use of guiding action of the cam follower effected by the cam groove. In such a lens barrel, it is known that accuracy of position of the lens group is improved by providing an elastic member between two lens retaining members each of which retains a different lens group, and applying force of the elastic member to press the rotary barrel in the photographing optical axis direction to each lens retaining member, thereby eliminating looseness between the cam follower and the cam groove (eliminating backlash). Here, in the lens barrel, it is desirable to prevent an excessive pushing force from being applied to both lens retaining members, because the force to press in the photographing optical axis direction acts on the rotary barrel having the cam groove into which the cam follower of the lens retaining member is inserted, as rotating load to prevent rotation thereof.

Thus, in the lens barrel, it is considered that a lens retaining member located at an end, of three lens retaining members arranged in the photographing optical axis direction, is configured as a common spring support, and an elastic member is provided between the common spring support and each of the remaining two lens retaining members (see Japanese Patent Application Publication No. 2006-071844). The lens barrel of this configuration enables a stable pushing force to be applied to each lens retaining member, while preventing an excessive pushing force from being applied thereto.

SUMMARY OF THE INVENTION

In the conventional configuration as mentioned above, however, since a movement manner in a photographing optical system averages a rotating load while preventing an excessive pushing force from being applied to each lens retaining member by utilizing a relational interval change of the lens retaining members which retain lens groups, the relative interval change being a configuration in that, when one lens group approaches relative to the lens group retained by the lens retaining member as a common spring support, the other lens group moves away, the movement manner not only reduces a degree of freedom in an optical design of the photographing optical system but also is constrained by the optical design.

Here, in many cases, since in a photographing area in which each of lens groups is capable of photographing, a travel distance of each lens group to rotation of a rotary barrel in a photographing optical axis direction is not constant, the photographing optical system is such set that an angle made between a cam groove and a plane orthogonal to the photographing optical axis (hereinafter referred to as inclination of the cam groove) increases or decreases. Here, as the inclination of the cam groove increases, the rotating load of a rotary barrel due to the lens retaining member being pressed via a cam follower increases, and as the inclination of the cam groove decreases, the rotating load of the rotary barrel due to the lens retaining member being pressed via the cam follower decreases. Thus, a change in the inclination of the cam groove leads to a change in the rotating load when the rotary barrel is turned, that is to say, a fluctuation in the rotating load. In contrast, in the conventional configuration described above, since it is constrained by the optical design of the photographing optical system, it is difficult to address a fluctuation of the rotating load of the rotary barrel due to a change in the inclination of the cam groove, which thus leaves a room for improvement.

An object of the present invention is to provide a lens barrel capable of eliminating backlash while restraining a fluctuation in rotating load of a rotary barrel due to a change in inclination of a cam groove.

To accomplish the object, a lens barrel according to one embodiment of the present invention includes a lens retaining member which retains a lens group including at least one or more lenses as optical members of a photographing optical system and is provided with a retaining-side cam follower for receiving moving force in an optical axis direction of the lens group, a moving member which is movable in the optical axis direction within a predetermined range with respect to the lens retaining member and is provided with a moving-side cam follower for receiving the moving force in the optical axis direction, a rotary barrel on a peripheral surface of which a retaining-side cam groove into which the retaining-side cam follower is inserted and a moving-side cam groove into which the moving-side cam follower is inserted are provided, the rotary barrel being configured to rotate, thereby giving the lens retaining member moving force in the optical axis direction and giving the moving member the moving force in the optical axis direction, an elastic member which is provided between the lens retaining member and the moving member, and which gives the lens retaining member and the moving member relatively pushing force in the optical axis direction, and a rotating load restraining mechanism which restrains rotating load in a direction of rotation of the rotary barrel on the lens retaining member with the optical axis as a center of rotation, the rotating load being generated by the pushing force being given by the elastic body to the lens retaining member and the moving member.

The rotating load restraining mechanism is provided with the moving-side cam groove such that the angle made by the part on which the moving-side cam follower abuts and the plane orthogonal to the optical axis is made small, in a sharply inclined area where an angle made by a part on which the retaining-side cam follower abuts in the retaining-side cam groove and a plane orthogonal to the optical axis when viewed in the direction of rotation is large.

DETAILED DESCRIPTION OF THE PREFERRED EMBODIMENTS

Embodiments of a lens barrel according to the present invention will be described hereinafter with reference to the accompanying drawings.
[Embodiments]

Configurations of a lens barrel 13 as one embodiment of the lens barrel according to the present invention and of an imaging apparatus 10 as one embodiment of an imaging apparatus in which the lens barrel 13 is used will be described with reference to FIG. 1 to FIG. 13. Note that in FIG. 3 to FIG. 5, to facilitate understanding, the configuration of the lens barrel 13 is shown in a schematic cross section.

Figure 1:
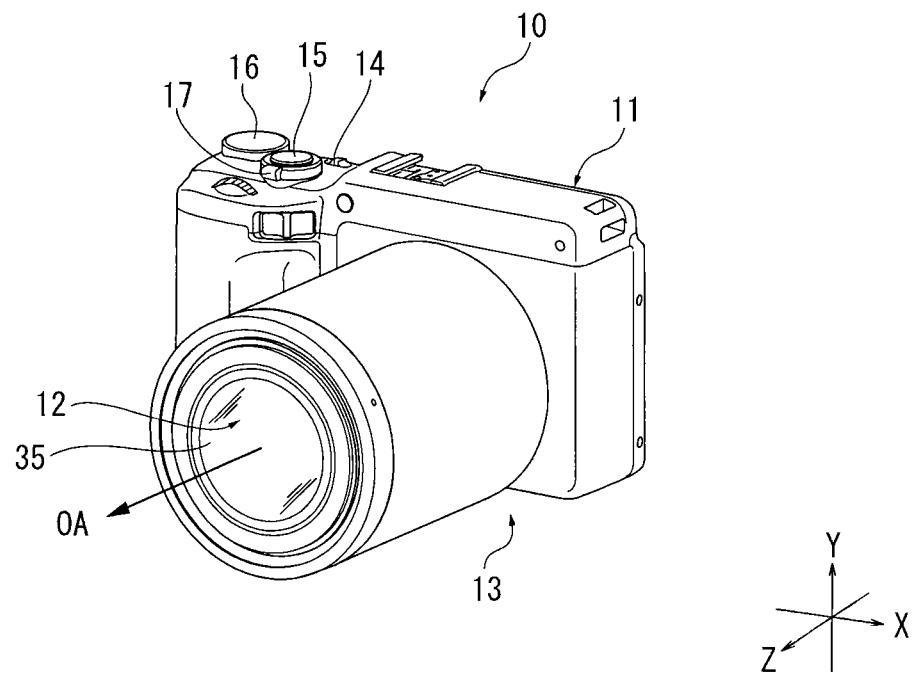
FIG. 1 is a schematic perspective view showing an imaging apparatus by way of example of an imaging apparatus in which a lens barrel according to one embodiment of the present invention is used, and showing a state which is made a predetermined storage position.

First, the imaging apparatus 10 by way of example of an imaging apparatus (digital camera) using the lens barrel 13 is described with reference to FIG. 1 and FIG. 2. As shown in FIG. 1, the imaging apparatus 10 is provided with the lens barrel 13 having a photographing optical system 12 on a front face (face on the front side when FIG. 1 is viewed from the front) of a camera main body 11. In the example shown, the lens barrel 13 is configured as a lens barrel unit which is attachable to and detachable from the camera main body 11.

The camera main body 11 is provided with a power switch 14, a shutter button 15, a mode switching dial 16, and a zoom lever 17 as an operation unit on a top surface (upper surface when FIG. 1 is viewed from the front) of the camera main body 11. The power switch 14 is used for performing an operation to start the imaging apparatus 10 (start operation) and an operation to stop the imaging apparatus 10 (stop operation). The shutter button 15 is a press-down operating member to be pressed down when a subject is photographed. The mode switching dial 16 is used for setting various types of scene mode, still image mode, moving image mode and the like. The zoom lever 17 is provided to continuously change a zoom position of the photographing optical system 12 (change a position in an optical axis direction of each optical member of the photographing optical system 12), in other words, to continuously expand (telephotographic side) or shrink (wide-angle side) an image. The zoom lever 17 is provided in such a manner as to surround the shutter button 15 for performing an operation of rotating (self-rotating) with an axis of rotation as a center of the rotation.

Figure 2:
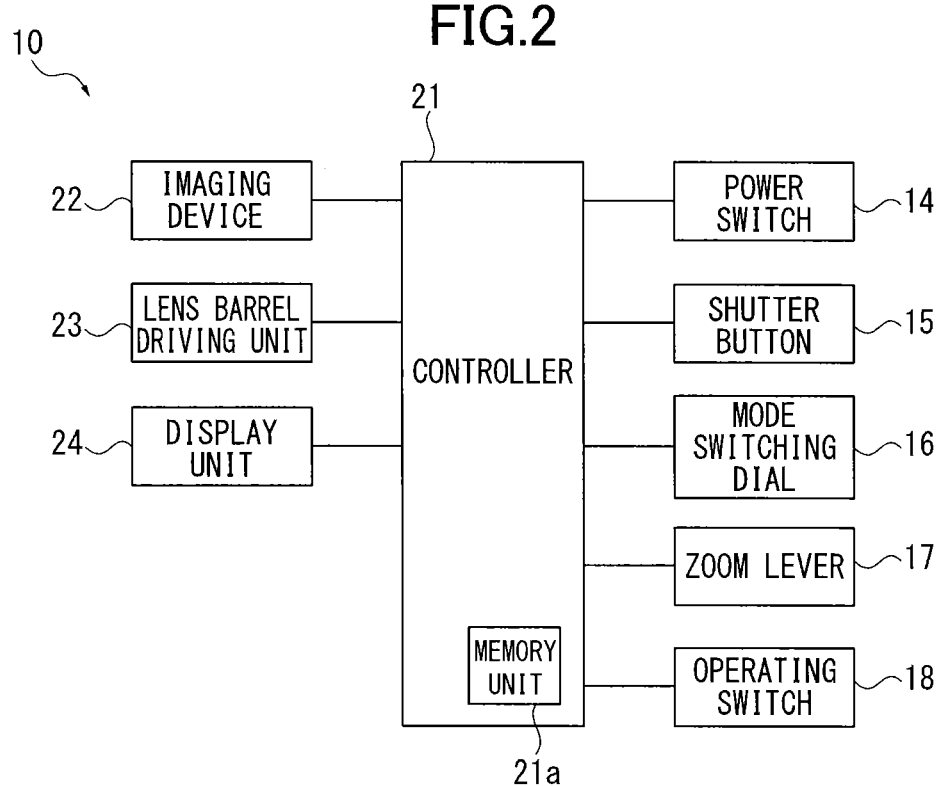
FIG. 2 is an illustration showing a control block in an imaging apparatus.

In addition, although not illustrated in detail, other operating switches 18 and a display unit 24 (or its display surface) are provided on a back face of the camera main body 11 (see FIG. 2). The operating switches 18 include a direction indicator switch for setting of each menu and the like, and various types of switches. In addition, the display unit 24 displays images based on data on photographed images or image data recorded in a recording medium.

Figure 3:
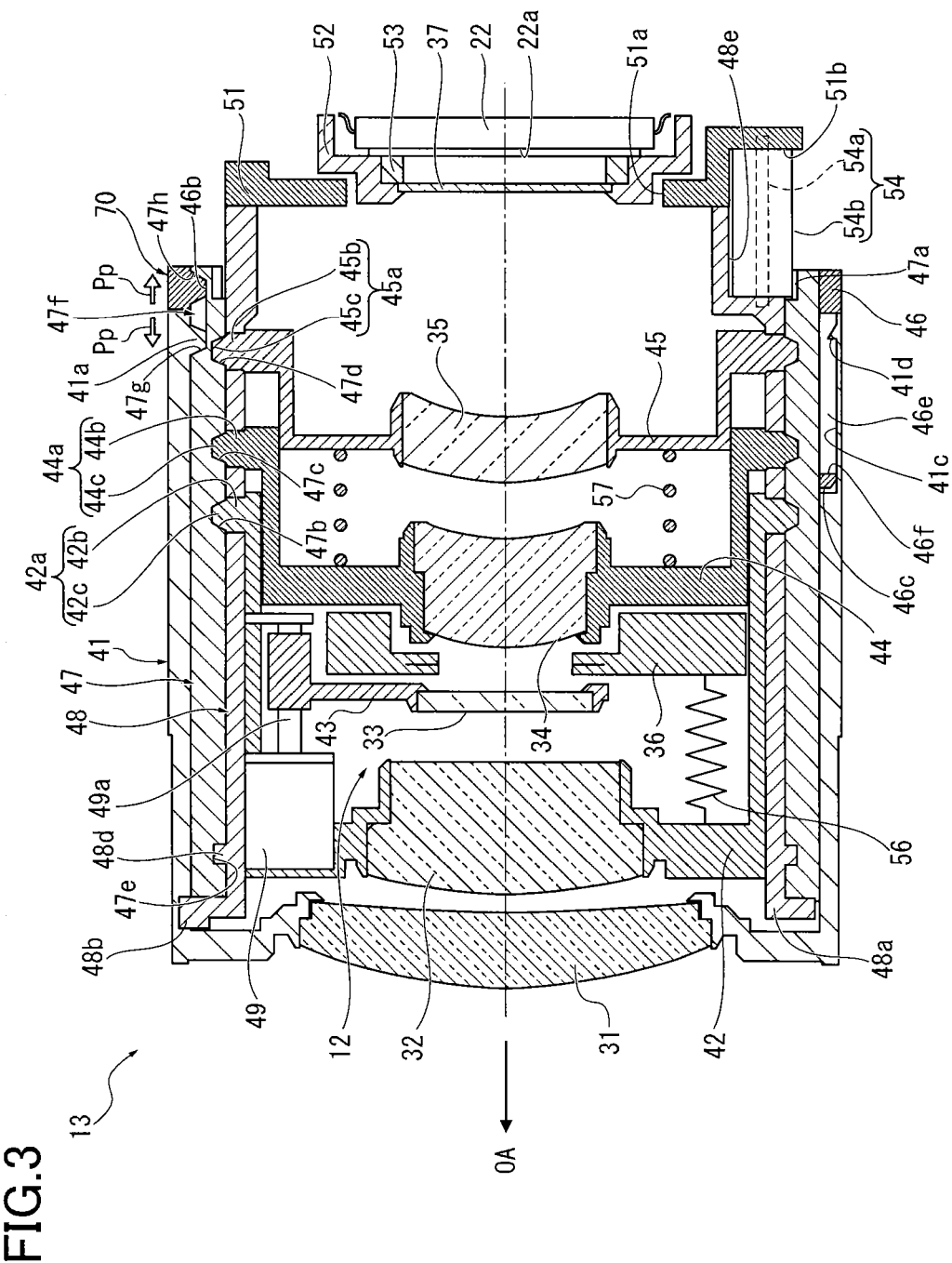
FIG. 3 is an illustration showing a lens barrel in a schematic cross section and a state which is made a predetermined storage position.
Figure 4:
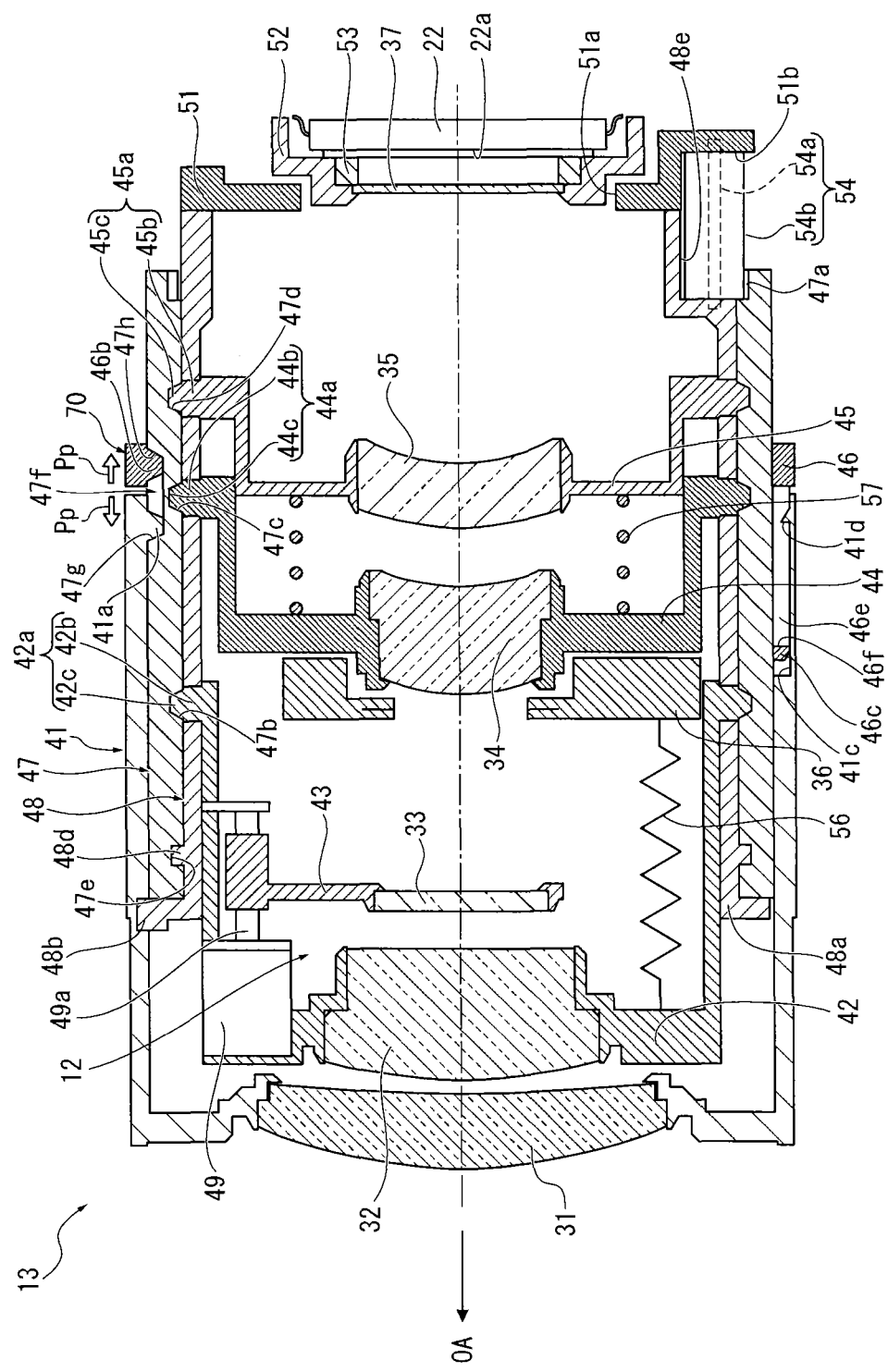
FIG. 4 is an illustration similar to FIG. 3, showing a lens barrel in a schematic cross section, and a state which is made a wide-angle position (wide) in a predetermined photographing standby position.
Figure 5:
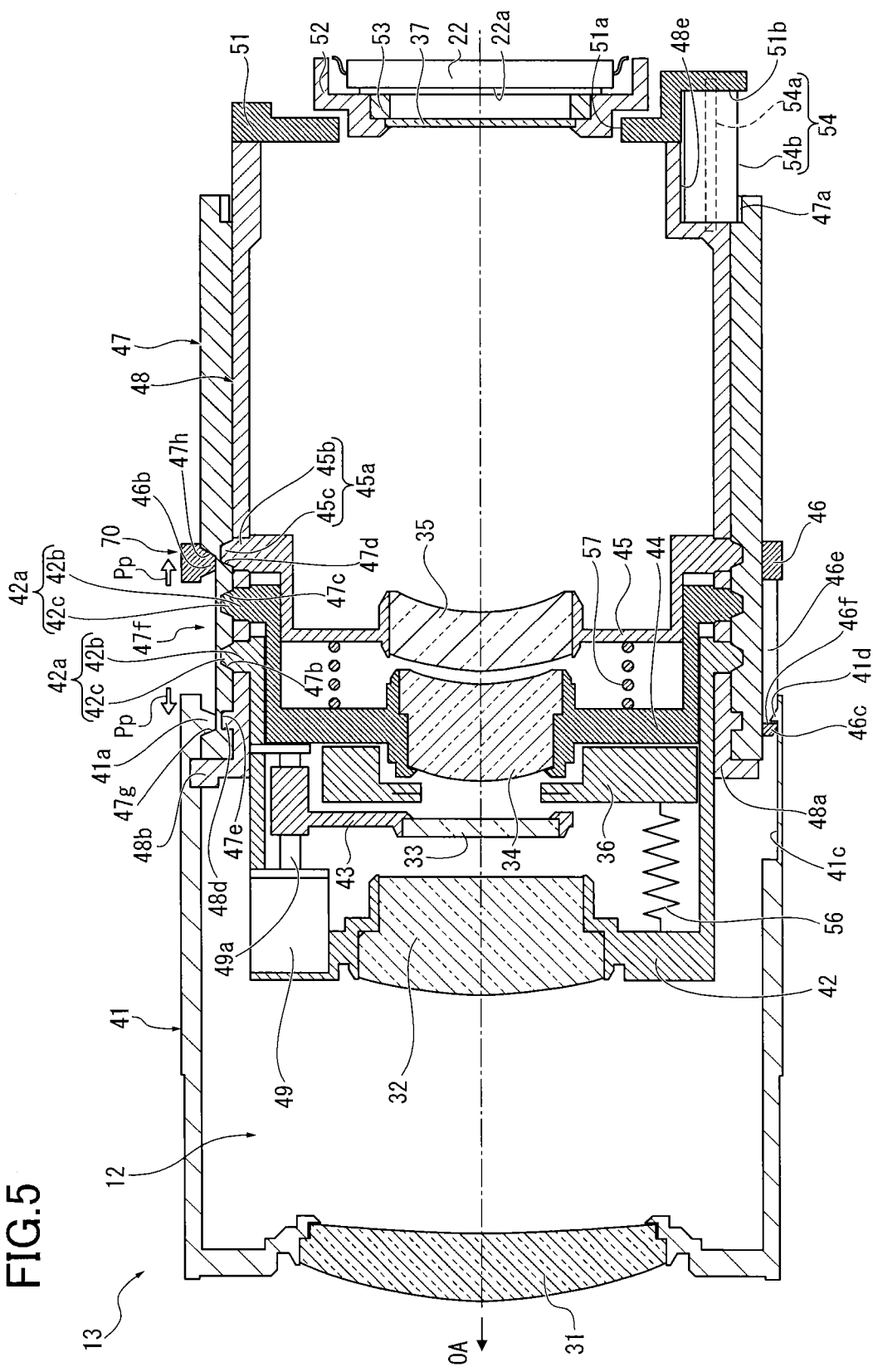
FIG. 5 is an illustration similar to FIG. 3, showing a lens barrel in a schematic cross section, and a state which is made a telephotographic position (tele) in a predetermined photographing standby position.

The imaging apparatus 10 records and processes, through an operation of pressing the shutter button 15, image data of a subject image, which is received through the photographing optical system 12 on a light receiving surface 22a (see FIG. 3 and others) of an imaging device 22, to be described below. The photographing optical system 12 includes 5 groups described below (see FIG. 3 to FIG. 5). The lens barrel 13 is capable of moving (advance and retract) along the optical axis of the photographing optical system 12 (photographing optical axis OA) between a predetermined storage position (see FIG. 1 and FIG. 3) and a predetermined photographing standby position (see FIG. 4 and FIG. 5). The lens barrel 13 shown in FIG. 1 and FIG. 3 (imaging apparatus 10) is during power-off (the power switch 14 is in OFF state) and is in a storage position in which the photographing optical system 12 (straight-travel barrel 41, to be described below (movable lens barrel)) is retracted most to the side of an image surface. In addition, the lens barrel 13 shown in FIG. 4 is during power-on time (the power switch 14 is in ON state), and is in a wide-angle position (wide) in the photographing optical system 12 configured as a zoom lens having a variable focal distance, to be described below, at the photographing standby position in which the photographing optical system 12 (a straight-travel barrel 41 (movable lens barrel) to be described later) is pulled to the subject side in a direction parallel to the photographing optical axis OA (hereinafter also referred to as a photographing optical axis direction), to be described below. In addition, the lens barrel 13 as shown in FIG. 5 is in a power-on time (the power switch 14 is in ON state), and in a telephotographic position (tele) in the photographing optical system 12 configured as a zoom lens with a variable focal distance, to be described below, at the photographing standby position in which the photographing optical system 12 (the straight-travel barrel 41 (the movable lens barrel) to be described below) is pulled out most to the subject side in the photographing optical axis direction. Note that the lens barrel 13 may be set to be in the photographing standby condition at the storage position described above.

As shown in FIG. 2, the imaging apparatus 10 has a controller 21, the imaging device 22, a lens barrel driving unit 23, and the display unit 24 described above. The controller 21 executes a driving process based on an operation performed for the power switch 14, the shutter button 15, the mode switching dial 16, the zoom lever 17, and the operating switches 18, as the operation unit, or an image data generation process based on a signal from the imaging device 22, or control such as driving and the like of the lens barrel driving unit 23 and the display unit 24, in an integrated manner by a program stored in a memory unit 21a. The controller 21 obtains an image with the imaging device 22 by way of the photographing optical system 12 and displays the image, as appropriate, on the display unit 24 provided on a rear face side of the camera main body 11.

The imaging device 22 is formed of a CCD (charge-coupled device) image sensor, a CMOS image sensor and the like. The imaging device 22 converts a subject image formed on the light receiving surface 22a (see FIG. 3 and others) through the photographing optical system 12 into an electric signal (image data), and outputs the signal. The outputted electric signal (image data) is transmitted to the controller 21.

In order to transfer the lens barrel 13 at a storage position (see FIG. 1 and FIG. 3) and at a photographing standby position (see FIG. 4 and FIG. 5), as described below, the lens barrel driving unit 23 causes the lens retaining members, supporting each of optical members of the photographing optical system 12, to move by driving a driving motor 55a (see FIG. 6 and others) of a zoom geared motor unit 55, as a drive source, and turning a rotary barrel 47 to a straight-travel liner 48. In addition, the lens barrel driving unit 23 performs focusing by driving a focus motor 49, to be described below.

Next, a schematic configuration of a lens barrel 13 as one embodiment of a lens barrel according to the present invention, which is used in an imaging apparatus 10, will be described with reference to FIG. 3 to FIG. 6. Note that in FIG. 6, an imaging device 22, an optical device 37, a retainer member 52, and a seal member 53 are omitted and not shown.

Figure 6:
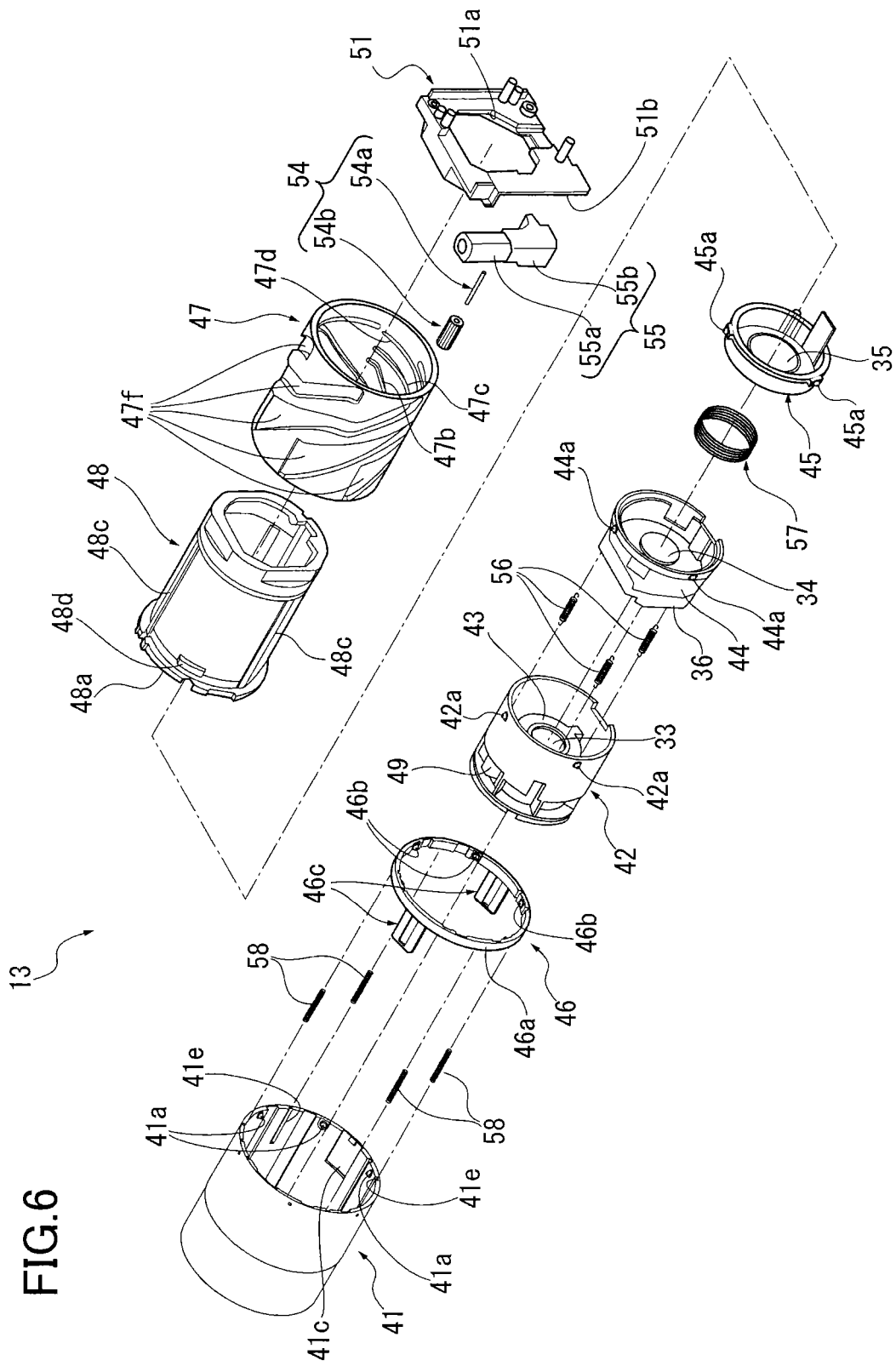
FIG. 6 is a schematic perspective view showing a lens barrel disassembled to components.

As shown in FIG. 3 to FIG. 6, the lens barrel 13 is equipped with a first lens group 31, a second lens group 32, a third lens group 33, a fourth lens group 34, a fifth lens group 35, a shutter/diaphragm unit 36, the above-mentioned imaging device 22, an optical device 37, a straight-travel barrel 41, a second lens retaining frame 42, a third lens retaining frame 43, a fourth lens retaining frame 44, a fifth lens retaining frame 45, a moving frame 46, the rotary barrel 47, a straight-travel liner 48, the focus motor 49, a base member 51, the retainer member 52, the seal member 53, a long gear 54, a zoom geared motor unit 55 (see FIG. 6 and others), first elastic members 56, a second elastic member 57, and a third elastic member 58 (see FIG. 6 and others).

In the lens barrel 13, from a subject (object) side are sequentially arranged the first lens group 31, the second lens group 32, the third lens group 33, the fourth lens group 34, and the fifth lens group 35, and the shutter/diaphragm unit 36 is located between the third lens group 33 and the fourth lens group 34. The optical device 37 and the imaging device 22 are provided on an image surface side of the fifth lens group 35. The optical device 37 is formed of a low-pass filter and the like and provided to cover the light receiving surface 22a of the imaging device 22. The optical device 37 and the imaging device 22 are retained by the retainer member 52. In the retainer member 52, the seal member 53 is provided between the retainer member 52 and the optical device 37, the seal member 53 sealing a space between the optical device 37 and the imaging device 22. The imaging device 22 (not shown) is mounted on a board in which electronic components are mounted to configure an electronic circuitry, and the board is fixed to the retainer member 52. The retainer member 52 (not clearly shown) is supported by the base member 51.

As shown in FIG. 6 and others, the base member 51 is generally shaped like a flat plate and is shaped like a rectangle when viewed in the photographing optical axis direction. An installation opening 51a penetrating to the photographing optical axis is provided at the center including the photographing optical axis OA, on the base member 51. The installation opening 51a enables placement on the optical axis OA of the optical device 37 and the imaging device 22 by way of the retainer member 52 (see FIG. 3 to FIG. 5). Thus, in the installation opening 51a of the base member 51, as shown in FIG. 3 to FIG. 5, the optical device 37 is provided on the subject side and the imaging device 22 is provided on the back side thereof (on the image surface negative side).

The first lens group 31 includes one or more lens. The first lens group 31 is fixed to the straight-travel barrel 41 and retained by way of the first lens retaining frame (not clearly shown) which integrally retains the first lens group. The first lens group 31 has an objective lens located most on the subject (object) side in the photographing optical system 12.

The second lens group 32 includes one or more lens. The second lens group 32 is fixed to and retained by the second lens retaining frame 42. Thus, the second lens retaining frame 42 functions as a lens retaining member for retaining the second lens group 32. At a rear end portion (end on the image surface side in the photographing optical axis direction) on an outer peripheral surface of the second lens retaining frame 42, a cam follower 42a is provided. The cam follower 42a protrudes from the outer peripheral surface radially (hereinafter also referred to as a radial direction) from the photographing optical axis OA. A base 42b, which will be a protrusion from the peripheral surface, is cylindrically shaped, and the cam follower 42a is capable of being inserted into a straight-travel key groove 48c, while being capable of abutting on the straight-travel key groove 48c (see FIG. 6) of the straight-travel liner 48 to be described below in a direction of rotation with the photographing optical axis OA as a center of rotation (hereinafter simply referred to as a rotation direction). In addition, a protruding end 42c, which is an outer tip in the radial direction, being shaped like a truncated cone having smaller diameter dimension than the base 42b, the cam follower 42a is capable of being inserted into a cam groove 47b of the rotary barrel 47 to be described below, while being able to abut on the cam groove 47b in the photographing optical axis direction. The focus motor 49 is fixed to the second lens retaining frame 42, and a lead screw 49a thereof is rotatably provided thereon.

The third lens group 33 includes one or more lens. The third lens group 33 is fixed to and retained by the third lens retaining frame 43. Thus, the third lens retaining frame 43 functions as a lens retaining member for retaining the third lens group 33. Although it is not clearly shown, the third lens retaining frame 43 is supported by the lead screw 49a of the focus motor 49 provided on the second lens retaining frame 42 by way of a nut mechanism or a rack mechanism. Although it is not clearly shown, the third lens retaining frame 43 is prevented from rotating with respect to the second lens retaining frame 42, and keeps the lead screw 49a rotatable by way of the nut mechanism or the rack mechanism mentioned above.

The focus motor 49 is configured to be driven and controlled to control movement of the third lens retaining frame 43 (third lens group 33) and perform rotary motion as appropriate. The focus motor 49 constitutes a drive source as the lens barrel driving unit 23 (see FIG. 2). The focus motor 49 has the lead screw 49a fixedly attached to a motor shaft (output shaft (not shown)). The lead screw 49a extends to a direction parallel to the photographing optical axis OA to be described below, is rotatably provided on the second lens retaining frame 42, and has a spiral thread groove on an outer peripheral surface which is not clearly shown. When the focus motor 49 is appropriately driven under the control of the controller 21 (see FIG. 2), the focus motor 49 rotates the lead screw 49a.

Thus, the third lens retaining frame 43, specifically, the third lens group 33 is capable of moving integrally with the second lens retaining frame 42, specifically, the second lens group 32 retained therein, to the photographing optical axis, and capable of moving, with respect to the second lens retaining frame 42 (the second lens group 32), to the photographing optical axis by driving of the focus motor 49. In the embodiment, the third lens group 33 is used as a focus lens for bringing an object into focus, specifically, focusing. A position of the third lens group 33 in the photographing optical axis is adjusted by driving force from the focus motor 49 when a focus is adjusted.

The fourth lens group 34 includes one or more lens. The fourth lens group 34 is fixed to and retained by the fourth lens retaining frame 44. Thus, the fourth lens retaining frame 44 functions as a lens retaining member for retaining the fourth lens group 34. The fourth lens retaining frame 44 integrally retains the shutter/diaphragm unit 36 (see FIG. 6 and others). The cam follower 44a is provided at a rear end on the outer peripheral surface of the fourth lens retaining frame 44 (end on the image surface side in the photographing optical axis direction). The cam follower 44a protrudes from the outer peripheral surface to the outside in the radial direction. A base 44b, which is a protrusion from the outer peripheral surface, being cylindrical shaped, the cam follower 44a is capable of being inserted into a straight-travel key groove 48c (see FIG. 6 and others) of the straight-travel liner 48 to be described below, while being able to abut on the straight-travel key groove 48c. In addition, a protrusion end 44c, which is an outer tip in the radial direction, the cam follower 44a, being shaped like a truncated cone having smaller diameter dimension than the base 44b, the cam follower 44a is capable of being inserted into a cam groove 47b of the rotary barrel 47 to be described below, while being able to abut on the cam groove 47b in the photographing optical axis direction.

The fifth lens group 35 includes one or more lens. The fifth lens group 35 is fixed to and retained by the fifth lens retaining frame 45. Thus, the fifth lens retaining frame 45 functions as a lens retaining member for retaining the fifth lens group 35. The cam follower 45a is provided at a rear end on the outer peripheral surface of the fifth lens retaining frame 45 (end on the image surface side in the photographing optical axis direction). The cam follower 45a protrudes from the outer peripheral surface to the outside in the radial direction. A base 45b, which is a protrusion from the outer peripheral surface, being cylindrical shaped, the cam follower 45a is capable of being inserted into a straight-travel key groove 48c (see FIG. 5 and others) of the straight-travel liner 48 to be described below, while being able to abut on the straight-travel key groove 48c. In addition, a protrusion end 45c, which is an outer tip in the radial direction, the cam follower 45a, being shaped like a truncated cone having smaller diameter dimension than the base 45b, the cam follower 45a is capable of being inserted into a cam groove 47b of the rotary barrel 47 to be described below, while being able to abut on the cam groove 47d in the photographing optical axis direction.

The shutter/diaphragm unit 36 integrally retained by the fourth lens retaining frame 44 includes a shutter and an aperture diaphragm. These first to fifth lens groups 31 to 35 (including the shutter/diaphragm unit 36) constitute the photographing optical system 12 as a zoom lens with a variable focal distance. The light receiving surface 22a of the imaging apparatus 22 (electronic circuitry) is positioned on an imaging position of the photographing optical system 12, specifically, an image surface on which a subject image is formed by the first lens group 31 to the fifth lens group 35 (including the shutter/diaphragm unit 36). In the specification, an optical axis in the photographing optical system 12, specifically, a rotation symmetrical axis which is at a position of a central axis of the lens optical axis of the photographing optical system 12 is made a lens optical axis of the photographing optical system 12, specifically, the photographing optical axis OA of the lens barrel 13. Thus, the photographing optical axis OA matches the optical axis of the first lens group 31, and its optical axis direction is the photographing optical axis direction.

Figure 7:
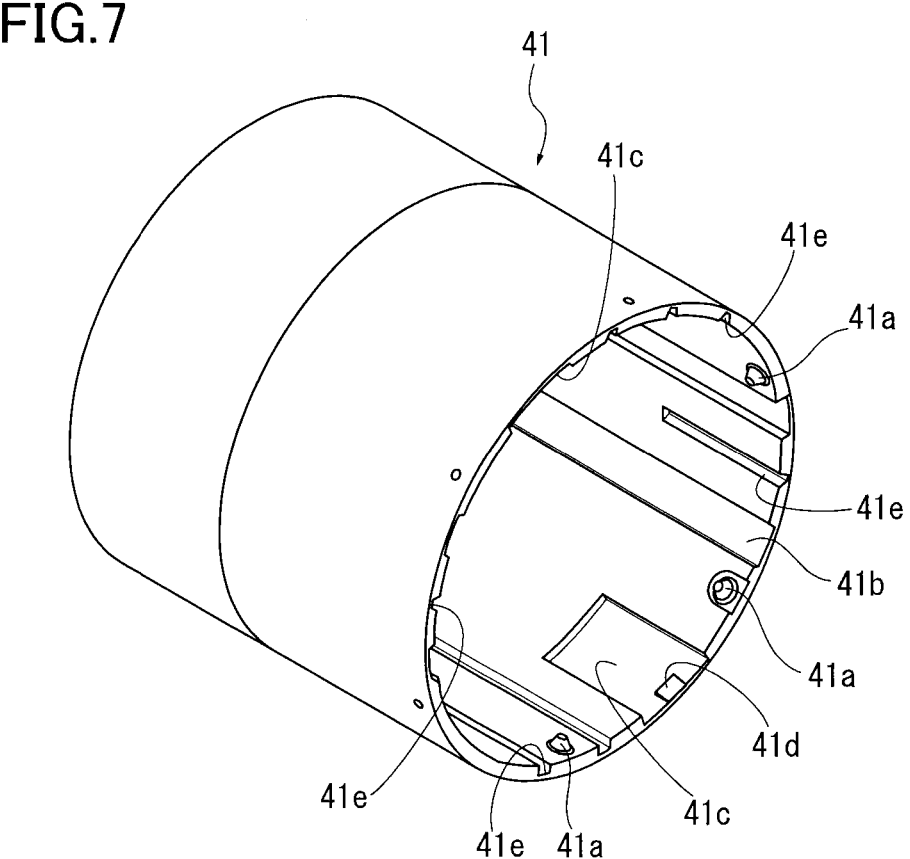
FIG. 7 is a perspective view showing a state of a straight-travel barrel 41 viewed from the side of an image surface.

The straight-travel barrel 41 which retains the first lens group 31 of the photographing optical system 12 by way of the first lens retaining frame (not clearly shown) is generally shaped like a cylinder (see FIG. 6 and FIG. 7). As shown in FIG. 3 to FIG. 7, the straight-travel barrel 41 functions as a lens retaining member for retaining the first lens group 31 in cooperation with the first lens retaining frame described above. The cam follower 41a is provided at a rear end on an inner peripheral surface of the straight-travel barrel 41 (end on the image surface side in the photographing optical axis direction). The cam follower 41a protrudes from the inner peripheral surface of the straight-travel barrel 41 to the inside of the radial direction. The cam follower 41a is shaped like a truncated cone, and is capable of being inserted into a cam recess 47f of the rotary barrel 47 to be described below, while being able to abut on an upper surface 47g of the cam recess 47f on the side of the subject in the photographing optical axis direction. In addition, on the inner peripheral surface of the straight-travel barrel 41 is provided a straight-travel groove 41b (see FIG. 7) extending in the photographing optical axis direction. The straight-travel groove 41b is capable of receiving a key section 48b of the straight-travel liner 48 to be described below, while being able to abut on the key section 48b in a direction of rotation. A moving frame 46 is provided at a rear end of the straight-travel barrel 41 (end on the image surface side of the photographing optical axis direction).

The moving frame 46 is provided movably in the photographing optical axis direction with respect to the straight-travel barrel 41 within a predetermined range and supported by the straight-travel barrel 41 in the embodiment. Thus, basically, the moving frame 46 moves together with the straight-travel barrel 41, with respect to the rotary barrel 47 and the straight-travel liner 48. Third elastic members 58 are provided between the moving frame 46 and the straight-travel barrel 41, and a rotating load restraining mechanism 70 sets operations on the straight-travel barrel 41 and the rotary barrel 47. A configuration and effect of the moving frame 46 will be described in detail below, together with a configuration and effect of the third elastic members 58 and the rotating load restraining mechanism 70. The rotary barrel 47 is fitted inward into the straight-travel barrel 41 and the moving frame 46, and the straight-travel liner 48 is fitted into the rotary barrel 47.

The straight-travel liner 48 is generally shaped like a cylinder (see FIG. 6), and fixed to the base member 51 so that the straight-travel liner 48 surrounds an installation opening 51a. As shown in FIG. 6, the straight-travel liner 48 has a flange section 48a at the tip (end on the subject side in the photographing optical axis direction). The flange section 48a is formed by the tip of the straight-travel liner 48 outwardly protruding all around the circumference in the radial direction. The key section 48b is provided on the flange section 48a. The key section 48b is formed by protruding from the outer peripheral surface of the flange section 48a in the radial direction and inserted into the straight-travel groove 41b (see FIG. 7) provided on the inner peripheral surface of the straight-travel barrel 41. Thus, the straight-travel liner 48 enables relative movement of the straight-travel barrel 41 in the photographing optical axis direction, while restricting rotation of the straight-travel barrel 41 with the photographing optical axis OA as a center of rotation (hereinafter referred to as rotation around the photographing optical axis OA) by causing the key section 48b to abut on the straight-travel groove 41b. With this, the straight-travel liner 48 functions as a guiding member for guiding movement of the straight-travel barrel 41 as a lens retaining member in the photographing optical axis direction.

The straight-travel key groove 48c is provided on a peripheral wall section of the straight-travel liner 48. The straight-travel key groove 48c is formed by extending in the photographing optical axis direction while penetrating the peripheral wall section in the radial direction. The base 42b of the cam follower 42a of the second lens retaining frame 42, the base 44b of the cam follower 44a of the fourth lens retaining frame 44, and the base 45b of the cam follower 45a of the fifth lens retaining frame 45 are threaded into the straight-travel key groove 48c (see FIG. 3 to FIG. 5). The straight-travel key groove 48c enables movement in the photographing optical axis direction of the inserted base 42b (cam follower 42a), the inserted base 44b (cam follower 44a), and the inserted base 45b (cam follower 45a), and limits rotation around the photographing optical axis OA. With this, the straight-travel liner 48 functions as a guiding member for guiding movement in the photographing optical axis direction of the second lens retaining frame 42 as the lens retaining member, and the third lens retaining frame 43, the fourth lens retaining frame 44 and the fifth lens retaining frame 45 provided therein.

The straight-travel liner 48 is provided with a follower 48d at a position near the flange section 48a on the outer peripheral surface. The follower 48d is provided to protrude in the radial direction along a plane orthogonal to the photographing optical axis OA. The follower 48d is inserted into a guiding groove 47e of the rotary barrel 47 to be described below, while being able to abut on the guiding groove 47e in the photographing optical axis direction.

A barrel-side installation recess 48e (see FIG. 3 to FIG. 5) is provided at a base end section (end of the image surface side in the photographing optical axis direction) of the straight-travel liner 48. The barrel-side installation recess 48e is formed at the base end section of the straight-travel liner 48 by depressing a part of the outer peripheral surface like a cylinder extending in the photographing optical axis direction. The barrel-side installation recess 48e has such a dimension that it can rotatably receive a long gear 54 to be described below, and is positioned to be contiguous with an installation recess 51b of the base member 51 to be described below in a state in which the straight-travel liner 48 is assembled to the base member 51 (see FIG. 3 to FIG. 5).

The rotary barrel 47 is generally cylindrically shaped. The rotary barrel 47 is provided to surround the straight-travel liner 48 (see FIG. 3 to FIG. 5 and others), and is capable of relatively rotating, centering around the photographing optical axis OA with respect to the straight-travel liner 48. A gear section 47a is formed at the base end section (end section on the image surface side in the photographing optical axis direction) on the inner peripheral surface of the rotary barrel 47 as shown in FIG. 3 to FIG. 5. Although the gear section 47a is not clearly shown, it is formed by a plurality of teeth extending in the photographing optical axis direction being juxtaposed in the direction of rotation on the inner peripheral surface of the rotary barrel 47.

In addition, the cam groove 47b, the cam groove 47c, the cam groove 47d, and the guiding groove 47e are provided on the inner peripheral surface of the rotary barrel 47. The cam groove 47b is formed by being displaced in the photographing optical axis direction (inclined to the plane orthogonal to the photographing optical axis OA) while surrounding the photographing optical axis OA (see FIG. 6). The cam groove 47b is configured to move the second lens retaining frame 42, and defines an optical cam trajectory for the second lens retaining frame 42, specifically, the second lens group 32. The cam groove 47b is capable of receiving the protruding end 42c of the cam follower 42a of the second lens retaining frame 42, while being able to abut on the protruding end 42c in the photographing optical axis direction.

The cam groove 47c is formed by being displaced in the photographing optical axis direction (inclined to the plane orthogonal to the photographing optical axis OA) while surrounding the photographing optical axis OA (see FIG. 6). The cam groove 47c is configured to move the fourth lens retaining frame 44, and defines an optical cam trajectory for the fourth lens retaining frame 44, specifically, the fourth lens group 34. The cam groove 47c is capable of receiving the protruding end 44c of the cam follower 44a of the fourth lens retaining frame 44, while being able to abut on the protruding end 44c in the photographing optical axis direction.

The cam groove 47d is formed by being displaced in the photographing optical axis direction (inclined to the plane orthogonal to the photographing optical axis OA) while surrounding the photographing optical axis OA (see FIG. 6). The cam groove 47d is configured to move the fifth lens retaining frame 45, and defines an optical cam trajectory for the fifth lens retaining frame 45, specifically, the fifth lens group 35. The cam groove 47d is capable of receiving the protruding end 45c of the cam follower 45a of the fifth lens retaining frame 45, while being able to abut on the protruding end 45c in the photographing optical axis direction. The guiding groove 47e is circumferentially provided along the plane orthogonal to the photographing optical axis OA, and is capable of receiving the follower 48d of the straight-travel liner 48, while being able to abut on the follower 48d in the photographing optical axis direction.

In addition, the cam recess 47f is provided on the outer peripheral surface of the rotary barrel 47. The cam recess 47f is formed by being displaced in the photographing optical axis direction (inclined to the plane orthogonal to the photographing optical axis OA) while surrounding the photographing optical axis OA (see FIG. 6 and others). The cam recess 47f constitutes the rotating load restraining mechanism 70 as described below, is a cam groove to move the straight-travel barrel 41 and the moving frame 46 with respect to the rotary barrel 47, and is capable of receiving the cam follower 41a of the straight-travel barrel 41 and the cam follower 46b of the moving frame 46 to be described below. A configuration of the cam recess 47f (rotating load restraining mechanism 70) will be described in detail below.

In the lens barrel 13, the first elastic members 56 are provided between the second lens retaining frame 42 and the fourth retaining frame 44. Each of the first elastic members 56 is formed of a helical extension spring which shrinks most in unloaded condition and produces elastic force that resists an action of separating one end from the other. Three of the first elastic members 56 are provided to bridge between the second lens retaining frame 42 and the fourth lens retaining frame 44 in the photographing optical axis direction. One end of each first elastic member 56 is fixed to the second lens retaining frame 42, while the other end is fixed to the shutter/diaphragm unit 36 provided on the fourth lens retaining frame 44. Inside the rotary barrel 47, each first elastic member 56 gives the second lens retaining frame 42 pushing force to the image surface side in the photographing optical axis direction, and the fourth lens retaining frame 44 (shutter/diaphragm unit 36) pushing force to the subject side in the photographing optical axis direction. In the embodiment, an amount of spring force of the three first elastic members 56 is set by considering an amount of spring force of the second elastic member 57, so that force pushing in the photographing optical axis direction can appropriately act on whichever of the second lens retaining frame 42 (the second lens group 32 and the third lens group 33) and the fourth lens retaining frame 44 (the fourth lens group 34 and the shutter/diaphragm unit 36) has heavier weight in a state in which an interval between the second lens retaining frame 42 and the fourth lens retaining frame 44 is smallest.

In addition, in the lens barrel 13, the second elastic member 57 is provided between the fourth lens retaining frame 44 and the fifth lens retaining frame 45. The second elastic member 57 is formed of a compressed coil spring which extends most in unloaded condition and produces elastic force that resists an action of bringing one end close to the other, and is provided to bridge between the second lens retaining frame 42 and the fourth lens retaining frame 44 in the photographing optical axis direction. One end of the second elastic member 57 is attached to the fourth lens retaining frame 44, while the other end is attached to the fifth lens retaining frame 45. Inside the rotary barrel 47, the second elastic member 57 gives the fourth lens retaining frame 44 pushing force to the subject side in the photographing optical axis direction and the fifth lens retaining frame 45 (shutter/diaphragm unit 36) pushing force to the image surface side in the photographing optical axis direction. In the embodiment, an amount of spring force of the second elastic member 57 is set by considering the amount of spring force of the three first elastic members 56, so that force pushing in the photographing optical axis direction can appropriately act on whichever of the fourth lens retaining frame 44 (the fourth lens group 34 and the shutter/diaphragm unit 36) and the fifth lens retaining frame 45 (fifth lens group 35) has heavier weight in a state in which an interval between the fourth lens retaining frame 44 and the fifth lens retaining frame 45 is largest.

In the lens barrel 13, the rotary barrel 47 is provided to surround the outside of the straight-travel liner 48 fixed to the base member 51, as shown in FIG. 3 to FIG. 6. The rotary barrel 47 has the guiding groove 47e receiving the follower 48d of the straight-travel liner 48, and brings the end of the subject side into contact with the flange section 48a (rear end face thereof) of the straight-travel liner 48 to receive the straight-travel liner 48. Thus, the rotary barrel 47 is prevented from moving in the photographing optical axis direction with respect to the straight-travel liner 48, and is capable of relatively rotating around the photographing optical axis OA (rotary motion).

Inside the straight-travel liner 48, the fifth lens retaining frame 45, the fourth lens retaining unit 44 integrally retaining the shutter/diaphragm unit 36, and the second lens retaining frame 42 supporting the third lens retaining frame 43 are fitted from the side of the subject in this order. Then, the second elastic member 57 is disposed between the fifth lens retaining frame 45 and the fourth lens retaining frame 44, and the three first elastic members 56 are provided between the shutter/ diaphragm unit 36 integrally retained by the fourth lens retaining frame 44 and the second lens retaining frame 42. The straight-travel liner 48 receives the base 45b of the cam follower 45a of the fifth lens retaining frame 45, the base 44b of the cam follower 44a of the fourth lens retaining frame 44, and the base 42b of the cam follower 42a of the second lens retaining frame 42 in the straight-travel key groove 48c (see FIG. 6). Thus, the straight-travel liner 48 can be moved relatively in the photographing optical axis direction, while restricting rotation around the photographing optical axis OA of the second lens retaining frame 42, the fourth lens retaining frame 44, and the fifth lens retaining frame 45 (including the third lens retaining frame 43 and the shutter/diaphragm unit 36).

The rotary barrel 47 surrounding the straight-travel liner 48 receives in the cam groove 47b the protruding end 42c of the cam follower 42a of the second lens retaining frame 42 the base 42b of which is inserted into the straight-travel key groove 48c of the straight-travel liner 48. In addition, the rotary barrel 47 receives in the cam groove 47c the protruding end 44c of the cam follower 44a of the fourth lens retaining frame 44 the base 44b of which is inserted into the straight-travel key groove 48c of the straight-travel liner 48. Furthermore, the rotary barrel 47 receives in the cam groove 47d the protruding end 45c of the cam follower 45a of the fifth lens retaining frame 45 the base 45b of which is inserted into the straight-travel key groove 48c of the straight-travel liner 48.

Here, when the rotary barrel 47 rotates with the photographing optical axis OA as a central axis with respect to the straight-travel liner 48, an intersecting position of the straight-travel key groove 48c and the cam groove 47b, an intersecting position of the straight-travel key groove 48c and the cam groove 47c, and an intersecting position of the straight-travel key groove 48c and the cam groove 47d move in the photographing optical axis direction. With this, when the rotary barrel 47 is rotationally driven, the second lens retaining frame 42 is subjected to moving force in the photographing optical axis direction from the cam groove 47b through the cam follower 42a (the protruding end 42c thereof) and linearly moves (movement in the photographing optical axis direction without involving a rotation around the photographing optical axis OA) to the photographing optical axis OA (photographing light path) with respect to the straight-travel liner 48 and the rotary barrel 47 so as to follow the cam trajectory of the cam groove 47b depending on a rotation profile of the rotary barrel 47. Similarly, the fourth lens retaining frame 44 is subjected to moving force in the photographing optical axis direction from the cam groove 47c of the rotary barrel 47 through the cam follower 44a (the protruding end 44c thereof) and linearly moves in the photographing optical axis direction with respect to the straight-travel liner 48 and the rotary barrel 47 so as to follow the cam trajectory of the cam groove 47c depending on a rotation profile of the rotary barrel 47. The fifth lens retaining frame 45 is subjected to moving force in the photographing optical axis direction from the cam groove 47d of the rotary barrel 47 through the cam follower 45a (the protruding end 45c thereof) and linearly moves in the photographing optical axis direction with respect to the straight-travel liner 48 and the rotary barrel 47 so as to follow the cam trajectory of the cam groove 47d depending on a rotation profile of the rotary barrel 47. Thus, the cam follower 42a of the second lens retaining frame 42, the cam follower 44a of the fourth lens retaining frame 44, and the cam follower 45a of the fifth lens retaining frame 45 function as a retaining-side cam follower, and the cam groove 47b, the cam groove 47c, and the cam groove 47d of the rotary barrel 47 function as a retaining-side cam groove.

The straight-travel barrel 41 and the moving frame 46 supported thereby are provided from the front of the straight-travel liner 48 (the subject side in the photographing optical axis direction) so as to surround the outside of the rotary barrel 47. The straight-travel barrel 41 receives in the straight-travel groove 41b (see FIG. 7) provided on the inner peripheral surface the key section 48b of the straight-travel liner 48 provided in the inside of the rotary barrel 47. The straight-travel barrel 41 is restricted in a rotation around the photographing optical axis OA and is capable of relative movement in the photographing optical axis direction with respect to the straight-travel liner 48. Basically, the moving frame 46 supported by the straight-travel barrel 41 is also capable of moving integrally with the straight-travel barrel 41 with respect to the straight-travel liner 48. In the straight-travel barrel 41, the cam followers 41a are inserted into the cam recesses 47f of the rotary barrel 47, and in the moving frame 46, the cam followers 46b are inserted into the cam recesses 47f of the rotary barrel 47, as described below. The cam followers 41a are always pressed against the upper surface 47g at the cam recesses 47f of the rotary barrel 47, as described below. With such a configuration, when the rotary barrel 47 is rotationally driven with respect to the straight-travel liner 48, the straight-travel barrel 41 linearly moves in the photographing optical axis direction with respect to the straight-travel liner 48 and the rotary barrel 47 so as to follow the cam trajectory of the cam recess 47f (the upper surface 47g thereof) depending on the rotation profile of the rotary barrel 47.

As such, in the lens barrel 13, the rotary barrel 47 is provided outside of the straight-travel liner 48 in the radial direction, and the straight-travel barrel 41 (moving frame 46) is provided outside of the rotary barrel 47 in the radial direction. In addition to the straight-travel liner 48, the rotary barrel 47 and the straight-travel barrel 41 (moving frame 46), the second lens retaining frame 42, the third lens retaining frame 43, the fourth lens retaining frame 44, and the fifth lens retaining frame 45, which are provided inside the straight-travel liner 48, constitute barrel parts.

As shown in FIG. 6, the long gear 54 and the zoom geared motor unit 55 are provided to rotationally drive the rotary barrel 47 with respect to the straight-travel liner 48, specifically, to move the photographing optical system 12 (the first lens group 31 to the fifth lens group 35). The zoom geared motor unit 55 has the driving motor 55a and a gear box 55b.

The driving motor 55a is configured to be driven and controlled to control movement of the photographing optical system 12 (the first lens group 31 to the fifth lens group 35) and perform rotary motion as appropriate, and constitutes a driving source as the lens barrel driving unit 23 (see FIG. 2). In the embodiment, the driving motor 55a is formed of a DC motor (so-called a direct current motor), and an output shaft engages with an input shaft provided on the gear box 55b, although a clear illustration is omitted. The gear box 55b is formed of a plurality of engaged gears (an illustration omitted), and is configured to adequately decelerate the rotational driving at an input gear and transmits it to an output gear (not shown).

The zoom geared motor unit 55 (the driving motor 55a and the gear box 55b) are provided in the installation recess 51b of the base member 51. The installation recess 51b not only allows the zoom geared motor unit 55, specifically, the driving motor 55a and the gear box 55b to be installed therein, but also allows the long gear to be installed therein (see FIG. 3 to FIG. 5). In addition, with the straight-travel liner 48, the rotary barrel 47, and the straight-travel barrel 41 (the barrel parts) assembled into the base member 51, the installation recess 51b is contiguous with the barrel-side installation recess 48e (see FIG. 3 to FIG. 5). The long gear 54 is provided in the barrel-side installation recess 48e.

The long gear 54 is generally shaped like a long cylinder, and is formed by a plurality of teeth extending in a longitudinal direction which are juxtaposed all around the outer peripheral surface. In the embodiment, the long gear 54 has a shaft section 54a and a gear main body 54b. The shaft section 54a is shaped like a long bar. The gear main body 54b is shaped like a long cylinder capable of receiving the shaft section 54a and is formed by the plurality of teeth extending in the longitudinal direction which are juxtaposed all around the outer peripheral surface. In the embodiment, the long gear 54 is configured by installation of the gear main body 54b in a rotatable manner to the shaft section 54b one end of which is inserted into a bearing hole (not shown) of the installation recess 51b of the base member 51, and the other end of which is inserted into a bearing hole (not shown) of the barrel-side installation recess 48e of the straight-travel liner 48. With this, in the cylindrically shaped space formed by the barrel-side installation recess 48e of the straight-travel liner 48 and the installation recess 51b of the base member 51, which are contiguous in the photographing optical axis, the long gear 54 is provided to be able to rotate the gear main body 54b in the direction of rotation with the axis of the shaft section 54a as a center. In other words, the straight-travel liner 48 cooperates with the base member 51 (the installation recess 51b thereof) in the barrel-side installation recess 48e, and rotatably sandwiches and retains the long gear 54.

In a state in which the long gear 54 is thus retained by the straight-travel liner 48, in the long gear 54, gear teeth provided on the gear main body 54b engage with the gear section 47a of the rotary barrel 47 at the end of the subject side in the photographing optical axis direction, and gear teeth provided on the gear main body 54b engage with the output gear (not shown) of the gear box 55b provided in the installation recess 51b at the end of the image surface side in the photographing optical axis direction. Thus, the long gear 54 can transmit driving force outputted from gear box 55b (the output gear thereof) to the rotary barrel 47 (the base end section thereof). With this, the long gear 54 functions as a transmitting member for transmitting to the rotary barrel 47 the driving force outputted from the driving motor 55a.

Next, assembly of the long gear 54 and the zoom geared motor unit 55 in the lens barrel 13 will be described. Note that a method and an order of the assembly are not limited to the embodiment.

First, one end of the shaft section 54a constituting the long gear 54 is fixed by press fitting to the bearing hole (not shown) of the installation recess 51b of the base member 51. Then, the long gear 54 (in the embodiment, the gear main body 54b rotates around the shaft section 54a) is rotatably provided around the rotation axis parallel to the photographing optical axis OA in the installation recess 51b, by placing the gear main body 54b onto the shaft section 54a. Then, the rotary barrel 47 and the straight-travel liner 48 assembled by insertion of the follower 48d of the straight-travel liner 48 into the guiding groove 47e of the rotary barrel 47 are assembled to the base member 51 by insertion of the other end of the shaft section 54a into the bearing hole (not shown) of the barrel-side installation recess 48e while receiving the long gear 54 in the barrel-side installation recess 48e of the straight-travel liner 48, and engagement of the gear teeth of the long gear 54 (the gear main body 54b) with the gear teeth of the gear section 57a of the rotary barrel 47. Thus, the long gear 54 is rotatably retained by the barrel-side installation recess 48e of the straight-travel liner 48 and the installation recess 51 of the base member 51. Then, the straight-travel liner 48 is fixed to the base member 51. The fixing may be done by adhesion, by welding, or use of a fixing member. Then, with the driving motor 55a combined with the gear box 55b, the driving motor 55a and the gear box 55b are installed in the installation recess 51b from the outside (the side) of the base member 51 in the radial direction (see FIG. 10, FIG. 11 and others). Then, although a clear illustration is omitted, the output gear (not shown) of the gear box 55b is caused to engage with the gear teeth of the long gear 54 (the gear main body 54b) provided in the installation recess 51b. With this, the long gear 54 and the zoom geared motor unit 55 are assembled in the lens barrel 13.

In the lens barrel 13, under the control of the controller 21 (see FIG. 2), the driving motor 55a is appropriately driven as a driving source of the lens barrel driving unit 23. Then, driving force of the driving motor 55a is outputted (transmitted) to the long gear 54 by means of the gear box 55b. Thus, in a space formed by the installation recess 51b of the base member 51 and the barrel-side installation recess 48e of the straight-travel liner 48, the long gear 54 is rotationally driven and transmits the driving force (rotating force) to the rotary barrel 47 by way of the gear sections 47a engaged with the gear teeth. With this, the driving force of the driving motor 55a is gear transmitted by way of the gear box 55b and the long gear 54, and the rotary barrel 47 is rotationally driven with respect to the straight-travel liner 48. Then, as described above, the straight-travel barrel 41, the second lens retaining frame 42, the fourth lens retaining frame 44, and the fifth lens retaining frame 45 linearly move in the photographing optical axis direction with respect to the straight-travel liner 48 and the rotary barrel 47 to follow the cam trajectory of the cam grooves (47b, 47c, 47d, 47f (and the upper surface 47g thereof), depending on the rotation profile of the rotary barrel 47. Then, the first lens group 31 retained in the straight-travel barrel 41 by way of the first lens retaining frame (not clearly shown), the second lens group retained in the second lens retaining frame 42, the third lens group 33 retained in the third lens retaining frame 43 provided on the second lens retaining frame 42, the fourth lens group 34 retained in the fourth lens retaining frame 44 and the shutter/diaphragm unit 36, and the fifth lens group 35 retained in the fifth lens retaining frame 45, specifically, the photographing optical system 12 linearly moves in the photographing optical axis direction as predetermined.

In the embodiment, when the power switch 14 is switched from OFF state to ON state, under the control of the controller 21 (see FIG. 2), the lens barrel 13 pulls out the straight-travel barrel 41 into a photographing standby position (see FIG. 4) and move the photographing optical system 12 to the subject side in the photographing optical axis direction. In the embodiment, the photographing standby position as shown in FIG. 4 is in a state in which the amount of pull-out of the straight-travel barrel 41 at the photographing standby position is smallest, and is in a wide-angle position (wide) in the photographing optical system 12. Thus, when a zoom lever 17 is rotationally operated, under the control of the controller 21 (see FIG. 2), the straight-travel barrel 41 (photographing optical system 12) is further pulled out to the subject side from the photographing standby position as shown in FIG. 4, and is capable of being set in a telephotographic position (tele) (see FIG. 5). Then, as described above, the photographing optical system 12 (the first lens group 31, the second lens group 32 and the third lens group 33, the fourth lens group 34 and the shutter/diaphragm unit 36, and the fifth lens group 35) linearly moves in the photographing optical axis direction and performs a zooming operation as predetermined. In addition, since with a focal distance of the photographing optical system 12 set, the zooming operation appropriately drives the focus motor 49 as a driving source of the lens barrel driving unit 23 under the control of the controller 21, a position of the third lens group 33 retained in the third lens retaining frame 43 in the photographing optical axis direction is adjusted and bringing an object into focus, specifically, focusing is performed. Furthermore, when the power switch 14 is switched from ON state to OFF state, under the control of the controller 21 (see FIG. 2), the lens barrel 13 retracts the straight-travel barrel 41 and places it at a storage position (see FIG. 1 and FIG. 3), and moves the photographing optical system 12 to the image surface side in the photographing optical axis direction (see FIG. 3).

Here, as described above, in the lens barrel 13, the three first elastic members 56 for which the amount of spring force is set are provided between the fourth lens retaining frame 44 (shutter/diaphragm unit 36) and the second lens retaining frame 42, and, as described above, the second elastic member 57 for which the amount of spring force is set is provided between the fifth lens retaining frame 45 and the fourth lens retaining frame 44.

Thus, in the second lens retaining frame 42, the cam follower 42a (the protruding end 42c thereof) is pressed against the image surface side in the photographing optical axis direction, with respect to the rotary barrel 47 into which the cam follower 42a is inserted, to have no backlash between the cam follower 42a (the protruding end 42c thereof) and the cam groove 47b (to eliminate backlash). In addition, in the fourth lens retaining groove 44 (the shutter/diaphragm unit 36), the cam follower 44a (the protruding end 44c thereof) is pressed against the subject side in the photographing optical axis direction with respect to the cam groove 47c of the inserted rotary barrel 47 to have no backlash between the cam follower 44a (the protruding end 44c thereof) and the cam groove 47c (to eliminate the backlash). Furthermore, in the fifth lens retaining frame 45, the cam follower 45a (the protruding end 45c thereof) is pressed against the cam groove 47d is pressed against the image surface side in the photographing optical axis direction with the cam groove 47d of the rotary barrel 47 into which the cam follower 45a is inserted, to have no backlash between the cam follower 45a (the protruding end 45c thereof) and the cam groove 47d (to eliminate the backlash).

This enables the straight-travel barrel 41 and the rotary barrel 47 to operate with respect to the straight-travel liner 48 together with the second lens retaining frame 42, the third lens retaining frame 43, the fourth lens retaining frame 44, and the fifth lens retaining frame 45 in the lens barrel 13, and the straight-travel barrel 41 and the rotary barrel 47 function as a movable lens barrel for appropriately moving each of the optical members (the first lens group 31, the second lens group 32, the third lens group 33, the fourth lens group 34, the shutter/diaphragm unit 36, and the fifth lens group 35) of the photographing optical system 12 in the photographing optical axis direction. The straight-travel barrel 41 and the rotary barrel 47 also function as an optical member storage frame for storing each optical member of the photographing optical system 12 together with the second lens retaining frame 42, the third lens retaining frame 43, the fourth lens retaining frame 44, and the fifth lens retaining frame 45. Furthermore, the lens barrel driving unit 23 functions as a storage frame driving means for appropriately driving the optical member storage frame by causing the driving motor 55a to appropriately rotate the rotary barrel 47.

Next, a configuration of the rotating load restraining mechanism 70, which is a characteristic part of the lens barrel 13 of the present invention, will be described with reference to FIG. 7 to FIG. 13 in addition to FIG. 3 to FIG. 6. Basically, the rotating load restraining mechanism 70 restrains an increase in rotating load of the rotary barrel 47. This is because the rotating load in the rotary barrel 47 may increase due to provision of the elastic members (each third elastic member 58 in the embodiment) for eliminating backlash between the straight-travel barrel 41 and the rotary barrel 47. In a scene in which the cam follower 41a of the straight-travel barrel 41 abuts on a sharply inclined area Si (see FIG. 9), to be described below, of the retaining-side cam groove (the upper side surface 47g of the cam recess 47f in the embodiment) for appropriately moving the straight-travel barrel 41 (the first lens group 31) in the photographing optical axis direction, the rotating load restraining mechanism 70 restrains a change in the rotating load, specifically, a fluctuation in the rotating load of the rotary barrel 47 when the rotary barrel 47 is turned, by reducing more rotating load in the rotary barrel 47 than other scene.

The lens barrel 13 has the straight-travel barrel 41, the moving frame 46 supported by the straight-travel barrel 41 to be movable in the photographing optical axis direction within a predetermined range with respect thereto, and the third elastic members 58 provided therebetween (see FIG. 6). In order to enable such a configuration, as shown in FIG. 7, straight-travel guide recesses 41c, an anti-pullout protrusion 41d, and the retaining hole 41e are provided on the inner peripheral surface of the straight-travel barrel 41.

The straight-travel guide recesses 41c are formed at the base end section of the straight-travel barrel 41 by being depressed like a plate extending in the photographing optical axis direction, while bending a part of the inner peripheral surface. The straight-travel guide recesses 41c are provided at two locations corresponding to the straight-travel guide protrusions 46c (see FIG. 8 and others), to be described below, of the moving frame 46. The straight-travel guide recesses 41c have a size dimension that enables the straight-travel guide protrusions 46c to be received movably in the photographing optical axis direction, while being capable of abutting on the straight-travel guide protrusions 46c in the direction of rotation.

The anti-pullout protrusion 41d is provided at the base end section side of the straight-travel barrel 41 in each straight-travel guide recess 41c and at an intermediate position when viewed from the direction of rotation (only one is shown in FIG. 7). The anti-pullout protrusion 41d is formed by being protruded from the straight-travel guide recess 41c to the inside of radial direction. The anti-pullout protrusion 41d can be inserted into the inside of a catch hole 46e, to be described below, of the straight-travel guide protrusion 46c of the moving frame 46, and has a size dimension and a shape that enable it to be caught by a catching end face 46 on the subject side in the photographing optical axis direction.

The retaining holes 41e are formed by depressing a part of the inner peripheral surface to a cylinder shape extending in the photographing optical axis direction at the base end section of the straight-travel barrel 41. Four retaining holes 41e are provided at four locations which correspond to the third elastic members 58 (see FIG. 6 and others) to be described below. The retaining holes 41e have a size dimension that enables the received third elastic members 58 to extend and shrink, while being able to individually receive the third elastic members 58 in the photographing optical axis direction. The moving frame 46 is fixed to the straight-travel barrel 41.

Figure 8:
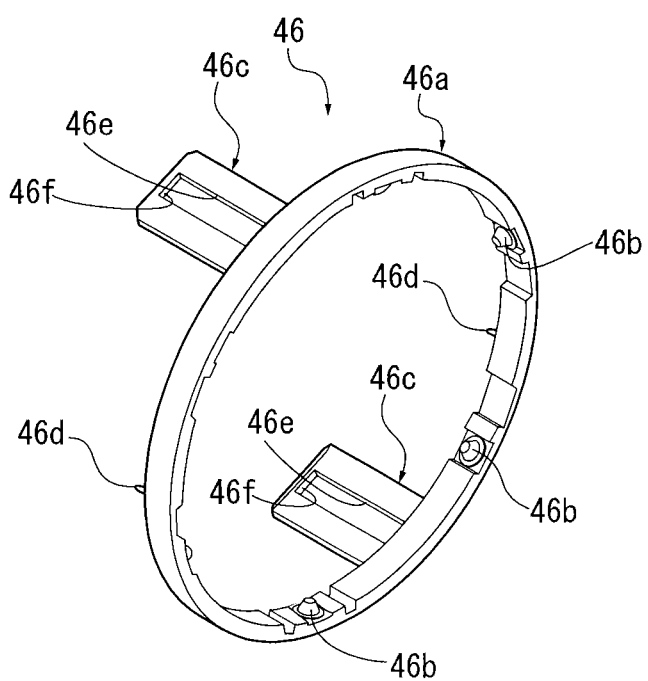
FIG. 8 is a perspective view showing a movement frame 46 viewed from the side of an image surface.

As shown in FIG. 8, the movement frame 46 is configured by provision of a plurality of cam followers 46b, a pair of the straight-travel guide protrusions 46c, and four mounting shafts 46d (only two of them shown in FIG. 8) in the frame main body 46a being generally ring shaped. The frame main body 46a has an inner diameter dimension and an outer diameter dimension equal to the straight-travel barrel 41, and is capable of surrounding the outside of the rotary barrel 47, similar to the straight-travel barrel 41. Surrounding the outside of the rotary barrel 47, the frame main body 46a (moving frame 46) is such that the end face on the subject side in the photographing optical axis direction can abut on the end face on the image surface side in the photographing optical axis direction (see FIG. 10 and others). Thus, in a state in which the straight-travel barrel 41 and the moving frame 46 (the frame main body 46a) surround the outside of the rotary barrel 47 and are provided, the cam follower 41a provided on the inner peripheral surface of the straight-travel barrel 41 is prevented from reaching the cam recess 47f (the lower side surface 47h thereof) of the rotary barrel 47 on which the each cam follower 46b abuts on the moving frame 46, to be described below, since the end face of the straight-travel barrel 41 on the image surface side in the photographing optical axis direction and the end face of the frame main body 46a of the moving frame 46 on the subject side in the photographing optical axis direction abut on each other even when the straight-travel barrel 41 and the moving frame 46 (the frame main body 46a) are caused to come closer.

Each cam follower 46b protrudes from the inner peripheral surface of the frame main body 46a to the inside in the radial direction. The cam follower 46b has a truncated cone shape, and can be inserted into the cam recess 47f while being able to abut on the cam recess 47f (the lower side surface 47h thereof) of the rotary barrel 47 on the image surface side in the photographing optical axis direction. In a state in which the moving frame 46 is supported by the straight-travel barrel 41, as described below, the cam follower 46b is such positioned that it is present on the image surface side while being lined up with respect to the cam follower 41a of the straight-travel barrel 41 in the photographing optical axis direction.

A pair of straight-travel guide protrusions 46c is shaped like a plate extending from the end of the frame main body 46a on the subject side in the photographing optical axis direction and bending to the subject side in the photographing optical axis direction. Each straight-travel guide protrusion 46c is provided to individually correspond with the two straight-travel guide recesses 41c of the straight-travel barrel 41, and has a size dimension which can be inserted into the straight-travel guide recess 41c to be movable in the photographing optical axis direction while being able to abut on the straight-travel guide recess 41c in the direction of rotation. The catch hole 46e is provided in each straight-travel guide protrusion 46c.

The catch hole 46e is formed by extending in the photographing optical axis direction while penetrating the center of the plate-shaped straight-travel guide protrusion 46c in the radial direction. The catch hole 46e is capable of receiving the anti-pullout protrusion 41d provided in the straight-travel guide recess 41c when each straight-travel guide protrusion 46c is inserted into the straight-travel guide recess 41c of the straight-travel barrel 41. In addition, the catch hole 46e has a size dimension and a shape which enable it to be caught by the received anti-pullout protrusion 41d at the catch end face 46f on the subject side in the photographing optical axis direction (see FIG. 5). Thus, the catch hole 46e (the catch end face 46f) can prevent the straight-travel guide protrusion 46c from being pulled out of the straight-travel guide recess 41c when each straight-travel guide protrusion 46c is inserted into the straight-travel guide recess 41c of the straight-travel barrel 41.

Four mounting shafts 46d have a cylinder shape extending from a position, which is the end of the frame main body 46a on the subject side in the photographing optical axis direction and differs from each straight-travel guide protrusion 46c, to the subject side in the photographing optical axis direction. As described below, each mounting shaft 46d is provided at each of four locations (only two of them are shown in FIG. 8) which correspond with the four third elastic members 58 (see FIG. 6 and others) provided, and corresponds with each of the four retaining holes 41e of the straight-travel barrel 41. Each mounting shaft 46d has a size dimension which enables it to be inserted into the inside of the third elastic member 58. The third elastic member 58 is provided on each mounting shaft 46d (see FIG. 6 and others).

The third elastic member 58 is an elastic member to be provided to eliminate backlash between the straight-travel barrel 41 and the rotary barrel 47. As shown in FIG. 6, the third elastic member 58 is provided between the straight-travel barrel 41 and the moving frame 46 and gives the straight-travel barrel 41 and the moving frame 46 relatively pushing force Pp (see FIG. 3 to FIG. 5 and FIG. 11) in the photographing optical axis direction. In the embodiment, the four third elastic members 58 are provided, each formed of a compressed coil spring which extends most in unloaded condition and produces elastic force that resists an action of bringing one end close to the other end (causing the pushing force to act on a direction which spaces one end from the other end). The third elastic member 58 is provided between the straight-travel barrel 41 and the moving frame 46 by the mounting shafts 46d (see FIG. 8) of the moving frame 46 being inserted into the inside of one end and the other end side being inserted into the retaining hole 41e (see FIG. 7) of the straight-travel barrel 41. Thus, the third elastic member 58 gives the straight-travel barrel 41 the pushing force Pp to the subject side in the photographing optical axis in the outside of the rotary barrel 47, and the moving frame 46 the pushing force Pp to the image surface side in the photographing optical axis direction. The amount of spring of the four third elastic members 58 is set amount of spring force of the three first elastic members 56 is set so that force pushing in the photographing optical axis direction can appropriately act on the straight-travel barrel 41 in a state in which an interval between the straight-travel barrel 41 and the moving frame 46 is largest (see FIG. 5 and FIG. 11), as described below.

In order to set operations of the moving frame 46 on the straight-travel barrel 41 and the rotary barrel 47, in the embodiment, the configuration of the cam recess 47f of the rotary barrel 47 is made different from other cam grooves (47b, 47c, 47d) so as to configure the rotating load restraining mechanism 70. In the following, the configuration of the cam recess 47f will be described with reference to FIG. 9 which is an illustration showing the cam recess 47f expanded to the circumferential direction (the direction of rotation of the rotary barrel 47) in the rotary barrel 47 (the outer peripheral surface thereof). Note that in FIG. 9, to facilitate understanding, parts where the outer circumferential surface is cut out as the cam recess 47f are shown in white, and dots are given to other parts. In addition, in FIG. 9, the right-left direction when viewed from the front correspond to the circumferential direction (the direction of rotation) in the rotation barrel 47, the up-down direction when viewed from the front corresponds in the photographing optical axis direction, and the upper side corresponds to the subject side. Furthermore, in FIG. 9, the aspect that rotation of the rotary barrel 47 with the photographing optical axis OA as a center of rotation rotates and moves the cam recess 47f with respect to the cam follower 41a and the cam follower 46b which move in the photographing optical axis direction is illustrated to facilitate understanding, by the cam follower 41a and the cam follower 46b being moved to the cam recess 47f.

Figure 9:
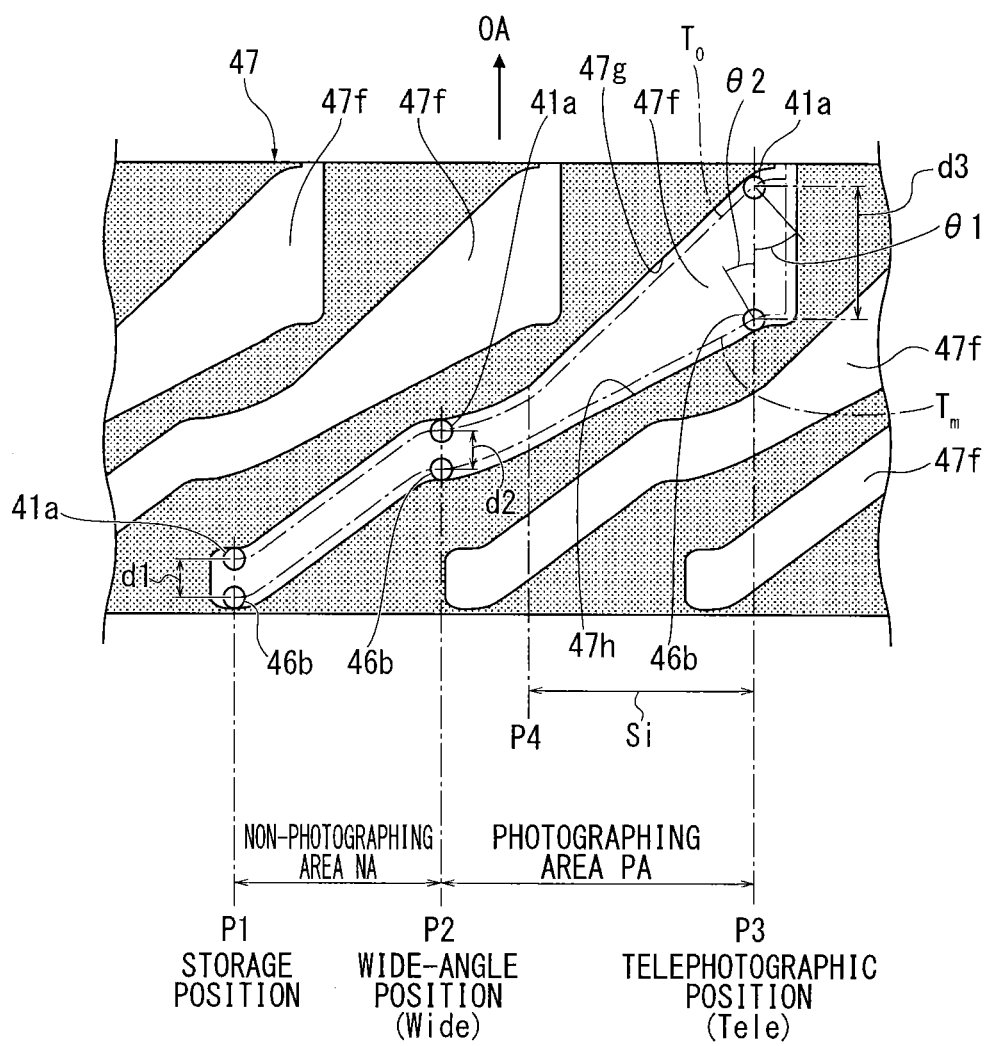
FIG. 9 is an illustration showing a cam recess in a rotary barrel (its outer peripheral surface), the cam recess being expanded to a circumferential direction (direction of rotation of the rotary barrel).

As shown in FIG. 6 and others, the cam recess 47f is formed with the outer peripheral surface of the rotary barrel 47 being cut out, and as shown in FIG. 9, is formed by surrounding the photographing optical axis OA and being displaced in the photographing optical axis direction (inclined to the plane orthogonal to the photographing optical axis OA). The cam recess 47f is capable of receiving both the cam followers 41a and the cam followers 46b of the moving frame 46 which are arranged in the photographing optical axis direction, and defines a different cam trajectory to each of them. Corresponding to the cam follower 41a being present on the subject side (the upper side when FIG. 9 is viewed from the front) in the photographing optical axis direction, the cam recess 47f defines an optical cam trajectory To for the cam followers 41a (the straight-travel barrel 41), specifically, the first lens group 31 on the upper side surface 47g on the subject side in the photographing direction. In addition, corresponding with the cam follower 46b being present on the image surface side (the lower side when FIG. 9 is viewed from the front) in the photographing optical axis direction, the cam recess 47f defines a moving cam trajectory Tm for movement of the cam follower 46b on the lower side surface 47h on the image surface side in the photographing optical axis direction, specifically the moving frame 46.

When viewed from the circumferential direction (the right-left direction when FIG. 9 is viewed from the front), the upper side surface 47g (the optical cam trajectory To) has an area from the circumferential position P1 to the circumferential position P2 set as a non-photographing area NA and an area from the circumferential position P2 to the circumferential position P3 set as a photographing area PA. On the upper side surface 47g, when the cam follower 41a abuts on the circumferential position P1, the straight-travel barrel 41 is in the storage position (see FIG. 1 and FIG. 3), when the cam follower 41a abuts on the circumferential position P2, the straight-travel barrel 41 is in a wide-angle position (wide) (see FIG. 4) in the photographing standby position, and the cam follower 41a abuts on the circumferential position P3, the straight-travel barrel 41 is in the telephotographic position (tele) (see FIG. 5).

The upper side surface 47g is capable of contacting the cam follower 41a while relatively sliding thereto. Depending on a position on which the cam follower 41a abuts, the straight-travel barrel 41 in which the cam follower 41a is provided, specifically, the first lens group 31 can be linearly operated between the wide-angle position (wide) (see FIG. 4) at the storage position (see FIG. 1 and FIG. 3) and at the photographing standby position and the telephotographic position (tele) (see FIG. 5) at the photographing standby position. Thus, the upper side surface 47g of the cam recess 47f functions as a retaining-side cam groove for movement of the straight-travel barrel 41, and the cam follower 41a functions as the retaining-side cam follower.

Here, on the upper side surface 47g, an angle made to the plane orthogonal to the photographing optical axis OA (hereinafter referred to the inclination of the upper side surface 47g) is set as follows. On the upper side surface 47g, the inclination between the circumferential position P1 and the circumferential position P2 (non-photographing area NA) is set from the standpoint of performing prompt movement between the storage position (see FIG. 1 and FIG. 3) of the first lens group 31 and the wide-angle position (see FIG. 4) at the photographing standby position, while considering load to the zoom geared motor unit 55 (the driving motor 55a thereof) due to the cam follower 41a abutting (the guiding action). Thus, the inclination between the circumferential position P1 and the circumferential position P2 on the upper side surface 47g is made monotonous.

In addition, the inclination between the circumferential position P2 and the circumferential position P3 (the photographing area PA) on the upper side surface 47g is set from the standpoint that depending on an optical design of the photographing optical system 12, the first lens group 31 is moved between the wide-angle position (see FIG. 4) and the telephotographic position (see FIG. 5), specifically, the first lens group 31 has a predetermined positional relationship with the second lens group 32 to the fifth lens group 35 of the photographing optical system 12. Thus, the inclination between the circumferential position P2 and the circumferential position P3 on the upper side surface 47g is not monotonous and changes due to a position viewed from the circumferential direction (the direction of rotation). In the embodiment, the upper side surface 47g has gradual inclination between the circumferential position P2 (wide-angle position) and the circumferential position P4 (an angle made with the plane orthogonal to the photographing optical axis OA is small), and has a sharp inclination area Si which is sharply inclined between the circumferential position P4 and the circumferential position P3 (the telephotographic position) (the angle made with the plane orthogonal to the photographing optical axis OA is large).

The lower side surface 47h which is opposed to the upper side surface 47g in the photographing optical axis direction has an interval and inclination with the upper side surface 47g in the photographing optical axis direction set, to control a fluctuation in the rotating load of the rotary barrel 47 due to a change in the inclination of the upper side surface 47g. The lower side surface 47h is formed to correspond with the non-photographing area NA and the photographing area PA set for the upper side surface 47g. Thus, when the cam follower 46b abuts on the circumferential position P1, the moving frame 46 shall be in a storage position (see FIG. 1 and FIG. 3), when the cam follower 46b abuts on the circumferential position P2, the moving frame 46 shall be in the wide-angle position (wide) (see FIG. 4) at the photographing standby position, and when the cam follower 46b abuts on the circumferential position P3, the moving frame 46 shall be in the telephotographic position (tele) (see FIG. 5) at the photographing standby position.

The lower side surface 47h is capable of contacting the cam follower 46b while relatively sliding thereto. Depending on a position on which the cam follower 46b abuts, the moving frame 46 can be linearly operated between the wide-angle position (wide) (see FIG. 4) at the storage position (see FIG. 1 and FIG. 3) and at the photographing standby position and the telephotographic position (tele) (See FIG. 5) at the photographing standby position. Thus, the lower side surface 47h of the cam recess 47f functions as a moving-side cam groove for movement of the moving frame 46, and the cam follower 46b functions as the moving-side cam follower.

Here, the inclination between the circumferential position P1 and the circumferential position P2 (non-photographing area NA) on the lower side surface 47h is set almost equal to the upper side surface 47g. In addition, on the lower side surface 47h, an interval with the upper side surface 47g viewed in the photographing optical axis direction is set smallest on the premise that both the cam follower 41a and the cam follower 46b can be guidably received. Thus, the inclination between the circumferential position P1 and the circumferential position P2 on the lower side surface 47h is monotonous, and the interval with the upper side surface 47g is almost constant (an interval d1 at the circumferential position P1 and an interval d2 at the circumferential position P2 are almost equal).

In addition, the inclination between the circumferential position P2 and the circumferential position P3 (the photographing area PA) on the lower side surface 47h is set from the standpoints that a pressure angle θ with the cam follower 46b is reduced to control a fluctuation in the rotating load of the rotary barrel 47 due to a change in the inclination of the upper side surface 47g and that an interval between the straight-travel barrel 41 and the moving frame 46 in the photographing optical axis direction is changed. This will be based on the following.

First, the pressure angle θ is an angle made between a normal direction of the cam trajectories (the optical cam trajectory To, the moving cam trajectory Tin) defined by the cam grooves (the upper side surface 47g, the lower side surface 47h) and a direction in which the cam followers (the cam follower 41a, the cam follower 46b) guided by the cam grooves are driven. In FIG. 9, the pressure angle to the cam follower 41a at the circumferential position P3 on the upper side surface 47g is represented by a symbol θ1, and a pressure angle to the cam follower 46b at the circumferential position P3 on the lower side surface 47h is represented by a symbol θ2. Here, since the cam follower 41a and the cam follower 46b are always driven in the photographing optical axis direction, the pressure angle θ is determined by an angle made between the upper side surface 47g or the lower side surface 47h and the plane orthogonal to the photographing optical axis OA, specifically, the inclination of the upper side surface 47g or the lower side surface 47h.

Here, rotating load generated by pressing of the cam follower 41a against the upper side surface 47g of the cam recess 47f or pressing of the cam follower 46b against the lower side surface 47h of the cam recess 47f shall be L. In addition, a distance from the photographing optical axis OA at a contact position where the cam follower 41a (the cam follower 46b) is pressed against the upper side surface 47g (the lower side surface 47h) shall be r. The distance r is made constant irrespective of a position in the circumferential direction (the direction of rotation) in the embodiment. In addition, load (force) of the direction of rotation (the circumferential direction) at a contact position for the distance r shall be made f, and the load (force) of the photographing optical axis direction at the contact position is made F. Additionally, a pressure angle between the cam follower 41a (the cam follower 46b) and the upper side surface 47g (the lower side surface 47h) shall be θ, and a friction angle of the cam follower 41a (the cam follower 46b) with the upper side surface 47g (the lower side surface 47h) shall be α. The friction angle α is determined by an angle made between the upper side surface 47g (the lower side surface 47h) and the radial direction, and made constant in the embodiment, irrespective of a position of the upper side surface 47g (the lower side surface 47h) in the circumferential direction (the direction of rotation). Then, the rotating load L can be represented by the following expression (1) based on an equation of equilibrium.

$$L = r \times f = r \times F \times \tan(\theta + \alpha) \tag{1}$$

As described above, since the distance r and the friction angle α is constant, it can be seen that the rotating load L is determined by the load F in the photographing optical axis direction and the pressure angle θ, from the above expression (1). Specifically, if the load F in the photographing optical direction is made constant, the rotating load L increases when the pressure angle θ increases, and the rotating load L decreases when the pressure angle θ decreases. Thus, in the photographing area PA (between the circumferential position P2 and the circumferential position P3) on the upper side surface 47g, the pressure angle θ of the sharply inclined area Si (between the circumferential position P4 and the circumferential position P3) is larger than other area (between the circumferential position P2 and the circumferential position P4), thus leading to increased rotating load L. Since this also applies to the lower side surface 47h, the pressure angle θ can be reduced by reducing the inclination (the angle made with the plane orthogonal to the photographing optical axis OA), thereby being able to restrain the rotating load L.

In addition, if the pressure angle θ is made constant, the rotating load L increases when the load L in the photographing optical axis direction increases. The load L in the photographing optical axis direction can be increased or decreased by changing the pushing force Pp (see FIG. 3 to FIG. 5 and FIG. 11) to be given to the straight-travel barrel 41 and the moving frame 46 by the third elastic members 58 provided between the straight-travel barrel 41 and the rotary barrel 47. Thus, the rotating load L can be reduced by reducing the pushing force PP to be given to the straight-travel barrel 41 and the moving frame 46 by the third elastic members 58.

Based on the above, the present invention makes the inclination of the lower side surface 47h at least smaller than the inclination of the upper side surface 47g from the standpoint that the upper side surface 47g reduces the pressure angle θ with the lower side surface 47h and the cam follower 46b in the sharply inclined area Si between the circumferential position P4 and the circumferential position P3. Here, since the upper side surface 47g defines the optical cam trajectory To set as the photographing optical system 12 as described above, any change to the inclination (position) of the upper side surface 47g leads to a change in an optical design of the photographing optical system 12. Thus, the present invention sets the inclination (position) to the upper side surface 47g on the lower side surface 47h (the moving cam trajectory Tm) which has no influence on the optical design of the photographing optical system 12.

In the embodiment, even in the photographing area PA, the area between the circumferential position P2 and the circumferential position P4, specifically, the area where the upper side surface 47g is not made the sharply inclined area Si, has the inclination equal to the upper side surface 47g. Then, the lower side surface 47h maintains the inclination at the circumferential position P4 in the area between the circumferential position P4 and the circumferential position P3 where the upper side surface 47g is made the sharply inclined area Si. In the embodiment, while the pressure angle θ1 with the upper side surface 47g and the cam follower 41a at the circumferential position P3 is set to 45 degrees, a pressure angle θ2 with the lower side surface 47h with the lower side surface 47h and the cam follower 46b at the circumferential position P3 is set to 30 degrees.

Thus, in the embodiment, even in the photographing area PA of the lower side surface 47h, the interval with the upper side surface 47g in the photographing optical axis direction is made constant between the circumferential position P2 and the circumferential position P4, and the position with respect to the upper side surface 47g maintains the state of the non-photographing area NA (between the circumferential position P1 and the circumferential position P2). Then, between the circumferential position P4 and the circumferential position P3 where the upper side surface 47g is the sharply inclined area Si, the lower side surface 47h exists at a position away from the upper side surface 47g to the image surface side in the photographing optical axis direction, so that the interval between the upper side surface 47g and the lower side surface 47h in the photographing optical axis direction progressively expands as the lower side surface goes from the circumferential position P4 to the circumferential position P3. Thus, the interval d3 between the lower side surface 47h and the upper side surface 47g at the circumferential position P3 is significantly larger than the interval d2 between the lower side surface 47h and the upper side surface 47g at the circumferential position P2.

With this, between the circumferential position P4 and the circumferential position P3 where the upper side surface 47g is the sharply inclined area Si, the inclination of the lower side surface 47h to the upper side surface 47g is smaller than other areas, and an amount of compression of each of the third elastic member 58 is small, thus reducing the pressing force Pp from each of the third elastic member 58.

Next, an assembly of the straight-travel barrel 41, the moving frame 46, and the third elastic member 58 in the lens barrel 13 is described. Note that a method and an order of the assembly are not limited to the embodiment.

As shown in FIG. 6, with each mounting shaft 46d of the moving frame 46 inserted into the inside of one end of the corresponding third elastic member 58 and the other end of each of the third elastic member 58 inserted into the corresponding holding hole 41e of the straight-travel barrel 41, both straight-travel guide protrusions 46c of the moving frame 46 are inserted into the corresponding straight-travel guide recesses 41c of the straight-travel barrel 41. Then, the moving frame 46 is mounted to the straight-travel barrel 41 by causing both straight-travel guide protrusions 46c to go over the anti-pullout protrusions 41d provided in the straight-travel guide recesses 41c. Then, due to the guiding action of both straight-travel guide protrusions 46c and both straight-travel guide recesses 41c, the moving frame 46 is supported by the straight-travel barrel 41 (see FIG. 10, FIG. 11 and others) so as to be movable in the photographing optical axis direction with respect to the straight-travel barrel 41. In addition, since the catch hole 46e of each of the straight-travel guide protrusions 46c catches the anti-pullout protrusion 41d in the straight-travel guide recess 41c on the catch end face 46f, the anti-pullout protrusion 41d being received in the inside of the catch hole 46e, a range movable with respect to the straight-travel barrel 41 is predetermined (a size dimension of the catch hole 46e), and the moving frame 46 is prevented from dropping from the straight-travel barrel 41. Furthermore, the cam follower 41a of the straight-travel barrel 41 and the cam follower 46b of the moving frame 46 are juxtaposed in the photographing optical axis direction. Thus, the straight-travel barrel 41 can be a unit which supports the moving frame 46 by way of the third elastic members 58. The straight-travel barrel 41 in such a unit state is assembled from the subject side of the straight-travel liner 48 in the photographing optical axis direction, so that the straight-travel barrel 41 surrounds the assembled rotary barrel 47, as described above. Then, the cam follower 41a of the straight-travel barrel 41 and the cam follower 46b of the moving frame 46 juxtaposed in the photographing optical axis direction are inserted into the cam recesses 47f of the rotary barrel 47. Thus, the straight-travel barrel 41, the moving frame 46, and the third elastic members 58 can be assembled as the lens barrel 13 (see FIG. 3 to FIG. 5, FIG. 10, and others).

Then, as shown in FIG. 3 to FIG. 5, since a pushing force to the subject side in the photographing optical axis direction is given by the third elastic member 58, the straight-travel barrel 41 is pressed against the upper side surface 47g on the subject side in the photographing optical axis direction with respect to the cam recess 47f into which the cam follower 41a is inserted, and there is no backlash between (backlash is eliminated) the cam follower 41a and the upper side surface 47g. In addition, since pushing force to the image surface side in the photographing optical axis direction is given by the third elastic member 58, the moving frame 46 is pressed against the lower side surface 47h in the photographing optical axis direction with respect to the cam recess 47f into which the cam follower 46b is inserted, and there is no backlash (backlash is eliminated) between the cam follower 46b and the lower side surface 47h. Here, since the amount of spring force of the third elastic members 58 is set to be able to cause the pushing force in the photographing optical axis direction to appropriately act on the straight-travel barrel 41 in a state in which the interval between the straight-travel barrel 41 and the moving frame 46 is largest (see FIG. 5 and FIG. 11), the cam follower 41a is always pressed against the upper side surface 47g of the cam recess 47f and the cam follower 46b is always pressed against the lower side surface 47h of the cam recess 47f.

Figure 10:
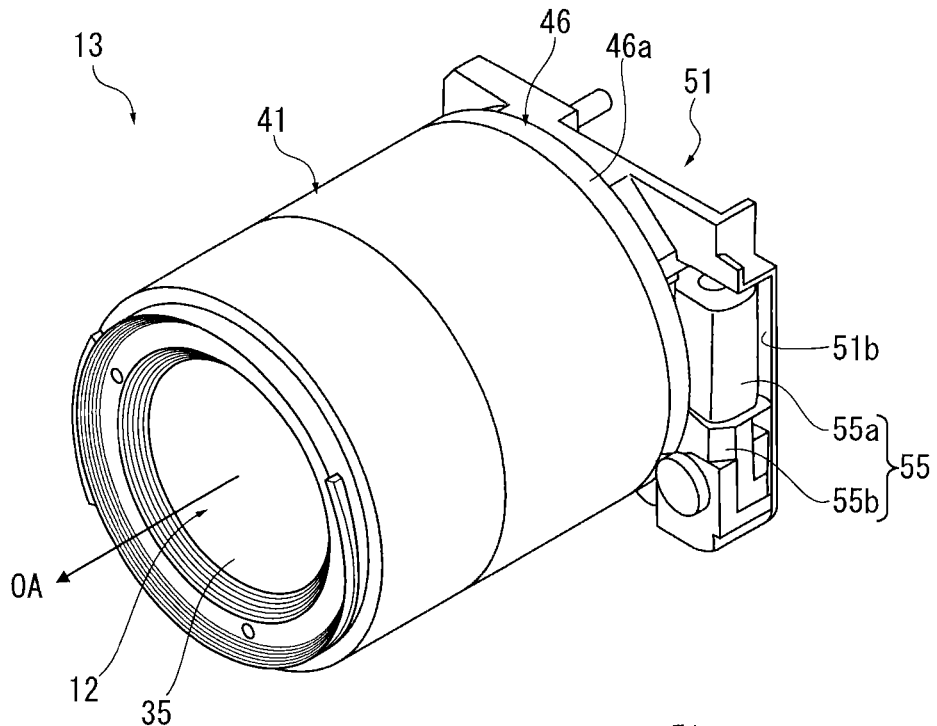
FIG. 10 is a schematic perspective view showing the lens barrel in FIG. 5 at a predetermined storage position.

In the lens barrel 13, when the power switch 14 is turned OFF and the straight-travel barrel 41 (the movable lens barrel) is in a retracted position (see FIG. 1 and FIG. 3) in which the straight-travel barrel 41 is retracted most to the image surface side, in the outside of the rotary barrel 47 (the straight-travel liner 48), the moving frame 46 retracts to the most image surface side in the photographing optical axis direction and the straight-travel barrel 41 retracts to the most image surface side in the photographing optical axis direction, as shown in FIG. 3 and FIG. 10. Then, the end surface of the moving frame 46 on the subject side in the photographing optical axis direction abuts on the end surface of the straight-travel barrel 41 on the image surface side in the photographing optical axis direction.

Then, in the lens barrel 13, the moving frame 46 in addition to the straight-travel barrel 41 is capable of relatively moving in the photographing optical axis direction, while being restricted in the rotation around the photographing optical axis OA with respect to the rotary barrel 47 and the straight-travel liner 48. Thus, when the power switch 14 is switched from OFF state to ON state and the straight-travel barrel 41 is pulled out to be in the photographing standby position (see FIG. 4), following the optical cam trajectory To of the upper side surface 47g of the cam recess 47f against which the cam flower 41a is pressed, the straight-travel barrel 41 linearly moves in the photographing optical axis OA direction with respect to the straight-travel liner 48 and the rotary barrel 47, and following the moving cam trajectory Tm of the lower side surface 47h of the cam recess 47f against which the cam follower 46b is pressed, the moving frame 46 linearly moves in the photographing optical axis OA direction with respect to the straight-travel liner 48 and the rotary barrel 47 (see FIG. 3 to FIG. 5, and FIG. 10 to FIG. 11). The upper side surface 47g and the lower side surface 47h are set for the cam recess 47f, as described above.

Thus, since the interval between the upper side surface 47g and the lower side surface 47h hardly changes (see FIG. 9) from the circumferential position P1 to the circumferential position P2 as the non-photographing area NA, specifically between the storage position to the photographing standby position (the wide-angle position thereof), the straight-travel barrel 41 and the moving frame 46 linearly move to the subject side in the photographing optical axis direction with respect to the straight-travel liner 48 and the rotary barrel 47 with the interval in the photographing optical direction hardly changing (see FIG. 3 to FIG. 4). In addition, since the interval between the upper side surface 47g and the lower side surface 47h hardly changes (see FIG. 9) from the circumferential position P2 to the circumferential position P4 as the photographing area PA, specifically in the area which is on the side of the wide-angle position (wide) at the photographing standby position and not the sharply inclined area Si, the straight-travel barrel 41 and the moving frame 46 linearly move to the subject side in the photographing optical axis direction with respect to the straight-travel liner 48 and the rotary barrel 47 with the interval in the photographing optical direction hardly changing. Then, since the interval between the upper side surface 47g and the lower side surface 47h expands (see FIG. 9) from the circumferential position P4 to the circumferential position P3 as the photographing area PA, specifically, in the sharply inclined area Si (including the telephotographic position (tele)) at the photographing standby position, the straight-travel barrel 41 and the moving frame 46 linearly move to the subject side in the photographing optical axis direction with respect to the straight-travel liner 48 and the rotary barrel 47 while the interval in the photographing optical axis direction expands as they move the circumferential position P3, specifically, the telephotographic position (tele) (see FIG. 4 to FIG. 5, and FIG. 10 to FIG. 11). Specifically, the ratio of the moving frame 46 being displaced to the subject side to a change in the rotation profile of the rotary barrel 47 is smaller than the ratio of the straight-travel barrel 41 being displaced to the subject side to a change in the rotation profile of the rotary barrel 47.

Figure 11:
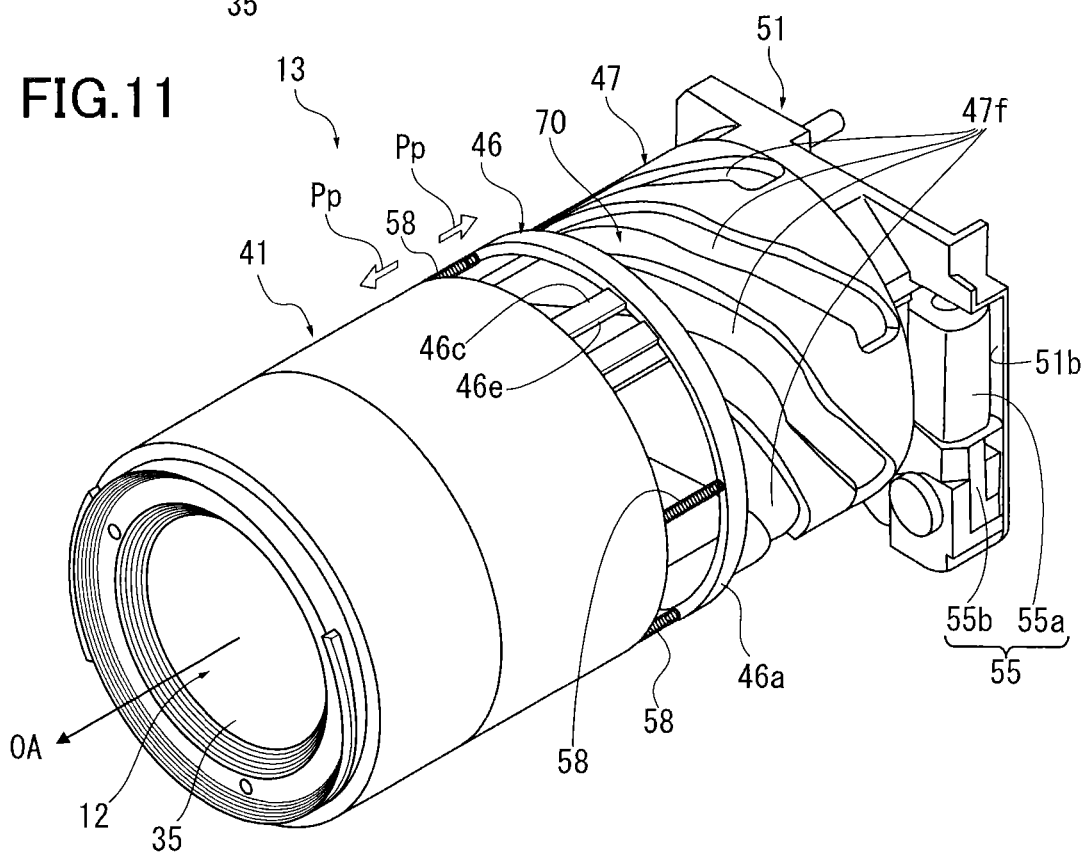
FIG. 11 is a schematic perspective view showing the lens barrel in FIG. 5 at a telephotographic position (tele) in a predetermined photographing standby position.

Thus, in the lens barrel 13, on the telephotographic position (tele) at the photographing standby position, in the outside of the rotary barrel 47 (the straight-travel liner 48), the straight-travel barrel 41 and the moving frame 46 are juxtaposed in the photographing optical axis direction while having the largest interval (see FIG. 5 and FIG. 11). Then, as shown in FIG. 11, in the lens barrel 13, the four third elastic members 58 extending in the photographing optical axis direction (only the three of them shown in FIG. 11) bridge between the straight-travel barrel 41 and the moving frame 46, and an interval therebetween is maintained by the pushing force Pp from the four third elastic members 58. In addition, if at the photographing standby position, the rotary barrel 47 is given rotational driving force in a pull-in direction from the driving motor 55a as the driving source of the lens barrel driving unit 23 by way of the gear section 47a (rotation opposite to the scene described above), the operation described above can be reversed. The straight-travel barrel 41 and the moving frame 46 retract to the most image surface side in the photographing optical axis direction (see FIG. 3, FIG. 10 and others) while abutting on each other, and the photographing optical system 12 is made a retractable position (see FIG. 3 and others).

In the lens barrel 13 of the embodiment, since the moving frame 46 and the third elastic members 58 are provided with respect to the straight-travel barrel 41 and the rotary barrel 47 as described above, a change in rotating load when the rotary barrel 47 is rotated, due to a change in the inclination of the upper side surface 47g (the optical cam trajectory To) as the retaining-side cam groove, specifically, a fluctuation in the rotating load of the rotary barrel 47, can be restrained. A comparative lens barrel C13 was prepared although a clear illustration thereof is omitted, as a comparison target of restraint of the fluctuation in the rotating load. The comparative lens barrel C13 basically has a similar configuration to the lens barrel 13 although an illustration is omitted, and differs from the lens barrel 13 only in a shape of a cam recess (corresponding to the cam recess 47f) into which a cam follower 41a of a straight-travel barrel 41 and a cam follower 46b of a moving frame 46 are inserted. Note that in the embodiment, since the comparative lens barrel C13 has the similar basic configuration to the lens barrel 13 except the shape of the cam recess, the same symbols and names as the lens barrel 13 are used to represent each member, unless otherwise indicated.

In the comparative lens barrel C13, in the cam recess provided on the outer peripheral surface of the rotary barrel 47, irrespective of whether it is in the non-photographing area NA or the photographing area PA, in other words, from the circumferential position P1 to the circumferential position P3, the interval between the upper side surface and the lower side surface in the photographing optical axis direction is constant. Similar to that from the circumferential position P1 to the circumferential position P4 in the lens barrel 13, the constant interval is set smallest on the premise that both the cam follower 41a and the cam follower 46b are guidably received. Thus, in the comparative lens barrel C13, the straight-travel barrel 41 and the moving frame 46 linearly move to the subject side in the photographing optical axis direction with the straight-travel liner 48 and the rotary barrel 47, with the interval in the photographing optical axis direction hardly changing. Note that in the comparative lens barrel C13, since the interval between the upper side surface and the lower side surface in the cam groove in the photographing optical axis direction is set constantly small as described above, the amount of spring force of each of the third elastic members 58 is set so that force pushing the straight-travel barrel 41 and the moving frame 46 in such a small interval can act appropriately. Specifically, in the comparative lens barrel C13, the amount of spring force of each of the third elastic members 58 is set so that when the comparative lens barrel C13 is in the telephotographic position (tele) in the photographing area PA, load F in the photographing optical axis direction that acts on the cam follower 41a of the straight-travel barrel 41 (this also applies to the cam follower 46b of the moving frame 46) is equal to load F in the photographing optical axis direction that acts on the cam follower 41a of the straight-travel barrel 41 (the cam follower 46b of the moving frame 46) when the lens barrel 13 is in the telephotographic position (tele) in the photographing area PA. Thus, in the case of an equal amount of compression, the amount of spring force in each of the third elastic members 58 of the lens barrel 13 is set larger than the amount of spring in each of the third elastic members 58 of the comparative lens barrel C13.

Figure 12:
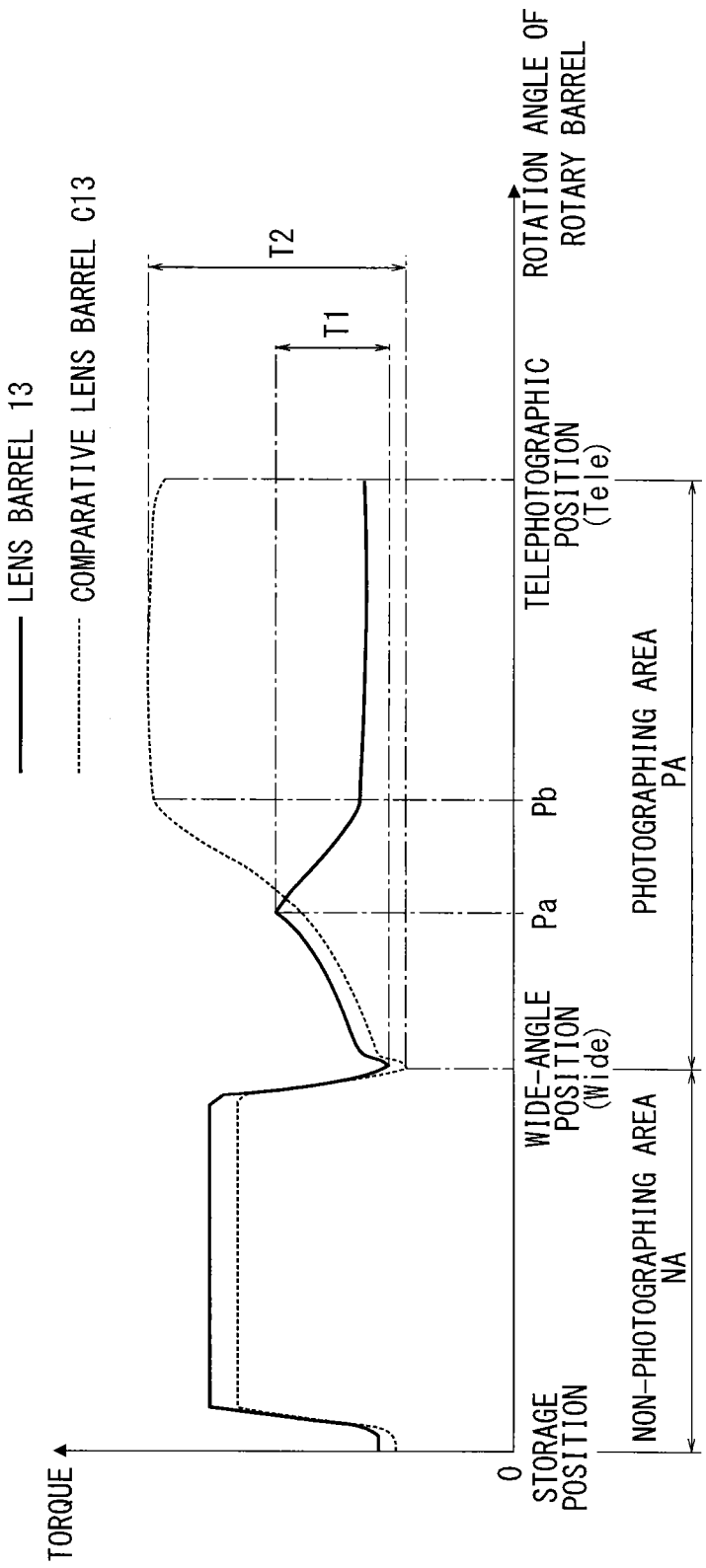
FIG. 12 is a graph showing an aspect of a change in torque at a lens barrel (its driving motor) and torque at a comparative lens barrel (its driving motor), a vertical axis being represented by the torque at the lens barrel (its driving motor) and the torque at the comparative lens barrel (its driving motor), and a horizontal axis being represented by a position of a rotation angle (rotation position) of the rotary barrel, in a photographing optical direction of a movable lens barrel (straight-travel barrel) in the lens barrel or the comparative lens barrel, with respect to a part where a cam follower abuts on a cam recess (cam groove), that is to say, a state of the photographing optical system.
Figure 13:
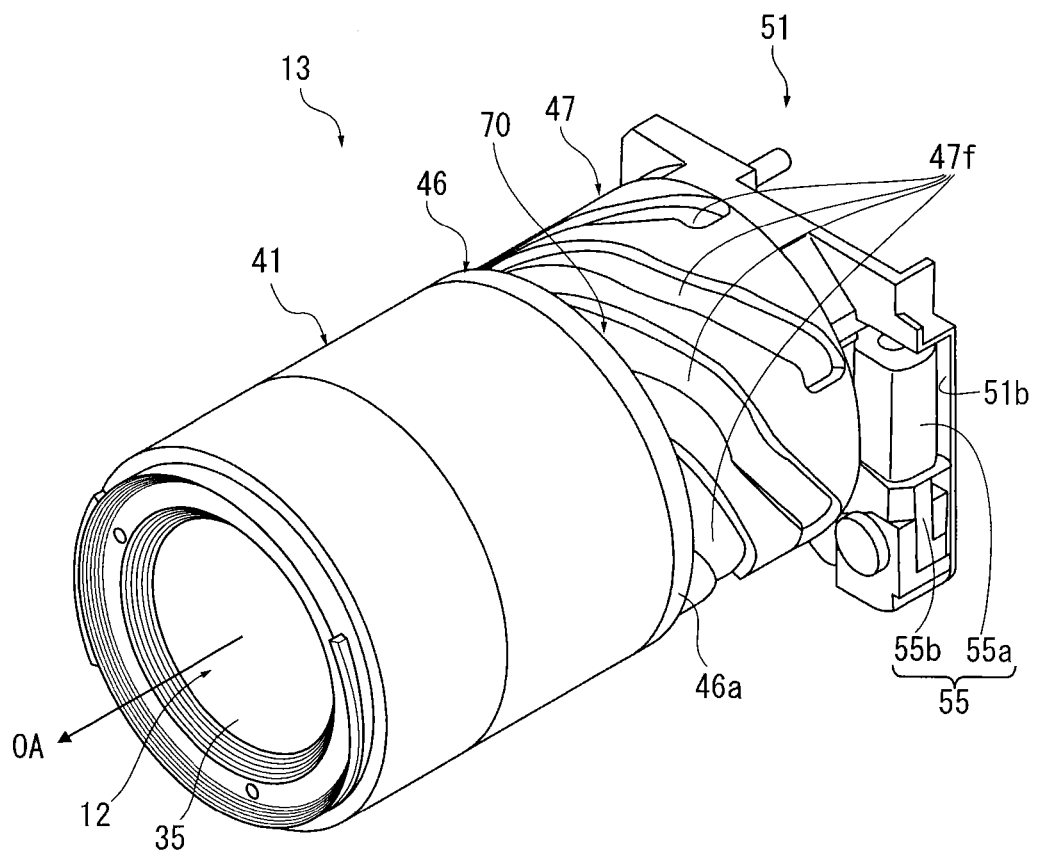
FIG. 13 is an illustration showing a state in which impact has been given to a tip in the lens barrel shown in FIG. 11.

In the lens barrel 13 and the comparative lens barrel C13, respectively, torques of the driving motor 55a when the lens barrels (each barrel part thereof) were driven by the lens barrel driving unit 23 under the same conditions were measured. The graph in FIG. 12 shows measurement results thereof. FIG. 12 is a graph showing an aspect of changes in the torques of the lens barrel 13 (the driving motor 55a thereof) and the torques of the comparative lens barrel C13 (the driving motor 55a thereof), with the vertical axis representing the torque of the lens barrel 13 (the driving motor 55a thereof) and the torques of the comparative lens barrel C13 (the driving motor 55a thereof), and the horizontal axis representing a rotation angle (a position of rotation) of the rotary barrel 47 relative to a part where the cam follower 41a abuts on the cam recess 47f (cam groove) by a position of the movable lens barrel (the straight-travel barrel 41) in the photographing optical axis direction in either the lens barrel 13 or the comparative lens barrel C13, specifically, state of the photographing optical system 12. Note that in FIG. 12, the torques of the lens barrel 13 have larger values than those of the comparative lens barrel C13 from the wide-angle position (wide) a little past a first protrusion position Pa (also similar to the non-photographing area NA) because, as described above, the amount of spring force in each of the third elastic members 58 is set larger in the lens barrel 13.

As shown in FIG. 12, between the photographing area PA, specifically, the wide-angle position (wide) and the telephotographic position (tele), while a range of fluctuations of the torques was T1 for the lens barrel 13 (the driving motor 55a thereof), while it was T2 (>T1) for the comparative lens barrel C13 (the driving motor 55a thereof). In detail, from the wide-angle position (wide) to the first protrusion position Pa, the torques of the lens barrel 13 and those of the comparative lens barrel C13 increase in almost equal aspect. However, while the torques of the lens barrel 13 (the driving motor 55a thereof) decrease past the first protrusion position Pa, those of the comparative lens barrel C13 (the driving motor 55a thereof) still increase past the first protrusion position Pa and at a second protrusion position Pb, stop increasing and keep the numeric values. This is because of the following. Note that since torques at the driving motors 55a in the lens barrel 13 and the comparative lens barrel C13 show an amount of force necessary to rotate the rotary barrel 47 to relatively move each of the barrel parts, not only an increase in the torques means an increase in the rotating load in the rotary barrel 47, but also a decrease in the torque means a decrease in the rotating load in the rotary barrel 47.

For the comparative lens barrel C13, since the interval between the upper side surface and the lower side surface in the cam recess in the photographing optical axis direction is constant irrespective of whether it is in the sharply inclined area Si, the load F in the photographing optical axis direction in the above-described expression (1) does not change. In addition, for the comparative lens barrel C13, in the sharply inclined area Si where inclination of the upper side surface in the cam recess is large, similar to the upper side surface, inclination of the lower side surface in the cam recess is also large. Thus, the pressure angle ($\theta$) to the cam follower 41a on the upper side surface increases, and the pressure angle ($\theta$) to the cam follower 46b on the lower side surface increases. Thus, since the pressure angle $\theta$ in the above-described expression (1) increases, more of the load F in the photographing optical axis direction acts as force of rotating the rotary barrel, and both the rotating load (L) due to pressing of the cam follower 41a of the straight-travel barrel 41 against the upper side surface in the cam recess and the rotating load (L) due to pressing of the cam follower 46b of the moving frame 46 against the lower side surface in the cam recess increase. Consequently, in the comparative lens barrel C13, the rotating load increases even past the first protrusion position Pa, and the range of fluctuations in the torques in the photographing area PA (between the wide-angle position (wide) and the telephotographic position (tele)) is T2.

In contrast, in the lens barrel 13, unlike the upper side surface 47g, even in the sharply inclined area Si where inclination of the upper side surface 47g of the cam recess 47f is large, inclination of the lower side surface 47h of the cam recess 47f does not increase (does not change). Thus, the pressure angle ($\theta$) to the cam follower 46b on the lower side surface 47h can be prevented from increasing. Thus, the pressure angle in the above-described expression (1) can be a constant numeric value, and an increase in the rotating load (L) due to pressing of the cam follower 46b of the moving frame 46 against the lower side surface 47h of the cam recess 47f can be prevented. Here, in the embodiment, while the pressure angle $\theta 1$ with the upper side surface 47g and the cam follower 41a at the telephotographic position (tele) is 45 degrees, the pressure angle $\theta 2$ with the lower side surface 47h and the cam follower 46b at the telephotographic position (tele) is 30 degrees. In addition, since the load F in the photographing optical axis direction equal to the straight-travel barrel 41 acts on the moving frame 46 the load F in the photographing optical axis direction that acts on the cam follower 46b is made equal to the load F in the photographing optical axis direction that acts on the cam follower 41a. In addition, when the lens barrel 13 and the comparative lens barrel C13 are in the telephotographic position (tele) in the photographing area PA, the load F in the photographing optical axis direction that acts on the cam follower 41a of the straight-travel barrel 41 and the load F in the photographing optical axis direction that acts on the cam follower 46b of the moving frame 46 are adapted to be equal to each other. Thus, compared with the comparative lens barrel C13, in the lens barrel 13, the rotating load (L) due to the pressing of the cam follower 46b of the moving frame 46 against the lower side surface 47h can be lowered to approximately 60% at the telephotographic position (tele). Note that in the lens barrel 13 and the comparative lens barrel C13, the rotating load (L) due to the pressing of the cam follower 41a of the straight-travel barrel 41 against the upper side surface 47g of the cam recess 47f is basically equal to each other at the telephotographic position (tele).

Additionally, in the lens barrel 13, in the sharply inclined area where the inclination of the upper side surface 47g of the cam recess 47f is large, since the interval between the upper side surface 47g (the straight-travel barrel 41 against which the cam follower 41a is pressed) and the lower side surface 47h (the moving frame 46 against which the cam follower 46b is pressed) gradually expands, the amount of compression of each of the third elastic members 56 gradually decreases, and the pushing force Pp to the straight-travel barrel 41 and the moving frame 46 to be given by each of the third elastic members 58 gradually decreases. Thus, in the lens barrel 13, in the sharply inclined area Si, the load F in the photographing optical axis direction in the above-described expression (1) can be made smaller than the photographing area PA from the circumferential position P2 to the circumferential position P4, specifically, in the area which is on the side of the wide-angle position (wide) at the photographing standby position and is not the sharply inclined area Si. Thus, both the rotating load (L) due to the pressing of the cam follower 41a of the straight-travel barrel 41 against the upper side surface 47g of the cam recess 47f and the rotating load (L) due to the pressing of the cam follower 46b of the moving frame 46 against the lower side surface 47h of the cam recess 47f can be reduced.

Consequently, although the cam follower 41a of the straight-travel barrel 41 is appropriately pressed against the upper side surface 47g of the cam recess 47f at the telephotographic position (tele) in the photographing area PA, the lens barrel 13 can make the rotating load at the telephotographic position (tele) smaller than the comparative lens barrel C13. Additionally, the lens barrel 13 can reduce the rotating load at the first protrusion position Pa by making smaller the inclination of the lower side surface 47h against which the cam follower 46b is pressed than the upper side surface 47g and increasing the interval between the upper side surface 47g and the lower side surface 47h in the photographing optical axis direction. Thus, the lens barrel 13 can make the range of fluctuations in torques in the photographing area PA (between the wide-angle position (wide) and the telephotographic position (tele)) T1 (<T2), while making the rotating load smaller than the comparative lens barrel C13. With this, the lower side surface 47h of the cam recess 47f of the rotary barrel 47 functions as a rotating load restraining mechanism 70 for restraining a fluctuation in the rotating load of the rotary barrel 47 in cooperation with the cam follower 46b of the moving frame 46 pressed against the lower side surface 47h, the upper side surface 47g of the cam recess 47f, and the cam follower 41a of the straight-travel barrel 41 pressed against the upper side surface 47g.

Here, a range of fluctuations in torques in the photographing area PA (between the wide-angle position (wide) and the telephotographic position (tele)) was compared due to the following. The non-photographing area PA (between the circumferential position P1 and the circumferential position P2) moves the straight-travel barrel 41 between the storage position (see FIG. 1 and FIG. 3) and the wide-angle position (wide) (see FIG. 4) at the photographing standby position. Thus, inclination of the upper side surface 47g in the non-photographing area NA (also similar to the lower side surface 47g) is set from the stand point of promptly moving between the storage position (see FIG. 1 and FIG. 3) of the first lens group 31 (the straight-travel barrel 41) and the wide-angle position (see FIG. 4) at the photographing standby position, while considering the load of the zoom geared motor unit 55 (the driving motor 55a thereof) due to the pressing the cam follower 41a (the guiding action). With this, since the inclination of the upper side surface 47g (the lower side surface 47h) in the non-photographing area NA can be appropriately set independent of an optical design of the photographing optical system 12, the rotating load in the non-photographing area NA can be appropriately reduced if the rotating load in the non-photographing area NA affects the range of fluctuations in the rotating load in all areas also including the photographing area PA. Thus, in the example described above, in the lens barrel 13 and the comparative lens barrel C13, the range of fluctuations in the torques in the photographing area PA (between the wide-angle position (wide) and the telephotographic position (tele)) is compared.

In addition to the above, the lens barrel 13 can be configured to prevent a large load from being applied to the movable lens barrel which operates depending on rotation of the rotary barrel 47 and any parts to which those operations are transmitted (for example, each cam groove and each cam follower, the gear teeth of the long gear 54 (the gear main body 54b) and the gear teeth of the gear section 47a of the rotary barrel 47, and the like), irrespective of rotation profile of the rotary barrel 47, specifically, a position of the movable lens barrel (the straight-travel barrel 41) in the photographing optical axis direction, even when any impact due to an external factor such as dropping of the imaging apparatus 10 or collision by other object, is given to the tip. This is for the following reasons.

When the impact described above is given to the tip, in the straight-travel barrel 41, pushing force to the image surface side in the photographing optical axis direction acts on the rotary barrel 47. Here, since the straight-travel barrel 41 is pushed by the pushing force Pp to be given by each of the third elastic members 58, to the subject side in the photographing optical axis direction with the moving frame 46 as a basic point, the cam follower 41a is pressed against the upper side surface 47g of the cam recess 47f, and an interval for pressing of the cam follower 46b of the moving frame 46 against the lower side surface 47h is provided in the lower part (the subject side in the photographing optical axis direction) of the upper side surface 47g in the cam recess 47f. Thus, when the pushing force to the image surface side acts, the straight-travel barrel 41 moves to the image surface side in the photographing optical axis direction with respect to the rotary barrel 47 and the moving frame 46, while resisting the pushing force Pp and shrinking each of the third elastic members 56. Thus, each of the third elastic members 58 can absorb the pushing force to the image surface side described above.

Additionally, if each of the third elastic members 58 cannot absorb the pushing force to the image surface side described above, as shown in FIG. 13, the straight-travel barrel 41 is displaced to the image surface side, and the end face of the straight-travel barrel 41 on the image surface side in the photographing optical axis direction abuts on the end face of the moving frame 46 on the subject side in the photographing optical axis direction. Thus, the pushing force to the image surface side as described above acts by way of the straight-travel barrel 41 to move the moving frame 46 to the image surface side in the photographing optical axis direction with respect to the rotary barrel 47. Then, in the moving frame 46, since the cam follower 46b is pressed to the lower side surface 47h of the cam recess 47 to the image surface side in the photographing optical axis direction, the lower side surface 47h and the cam follower 46b receive the pushing force to the image surface side described above. Thus, the pushing force to the image surface side described above acts on the lower side surface 47h and the cam follower 46b as the load F in the photographing optical axis direction in the above-described expression (1). Since the lower side surface 47h is set so that the inclination does not increase (does not change) even in the sharply inclined area Si where the inclination of the upper side surface 47g of the cam recess 47f is large, the pressure angle θ in the above-described expression (1) is prevented from increasing. In contrast, in the conventional technology in which the cam follower of the straight-travel barrel 41 is movably fitted into the cam groove for causing the straight-travel barrel 41 to move linearly, in the case of the sharply inclined area Si, the pushing force to the image surface side described above is received on the inclined surface having the large inclination, and the pressure angle θ in the above-described expression (1) increases. Thus, in the prior art, when the pushing force to the image surface side described above acts in the sharply inclined area Si, more of the pushing force acts as the force for rotating the rotary barrel, and large rotating force acts on the rotary barrel. In contrast, in the lens barrel 13, since the pushing force to the image surface side described above can be received by a generally inclined lower side surface 47h even in the sharply inclined area Si, the ratio of the force acting as the force for rotating the rotary barrel 47 can be reduced compared with the prior art. In the embodiment, while the pressure angle θ1 with the upper side surface 47g and the cam follower 41a at the circumferential position P3 is 45 degrees, the pressure angle θ2 with the lower side surface 47h and the cam follower 46b at the circumferential position P3 is 30 degrees. Thus, when the lower side surface 47h receives the pushing force to the image surface side described above, the force for rotating the rotary barrel 4 can be lowered to approximately 60% compared with the case in which the pushing force is received on a surface with inclination equal to the upper side surface 47g.

In the lens barrel 13 according to the present invention, in the sharply inclined area Si where the inclination of the upper side surface 47g of the cam recess 47f increases, the rotating load restraining mechanism 70 reduces more rotating load in the rotary barrel 47 due to the pushing force Pp to be given by each of the elastic members 58 than the other scenes. Thus, a change in the rotating load of the rotary barrel 47, that is, a fluctuation in the rotating load in the rotary barrel 47 can be restrained when the rotary barrel 47 is rotated to change a position of the movable lens barrel (the straight-travel barrel 41) in the photographing optical axis direction, while making it possible to appropriately press the cam follower 41a of the straight-travel barrel 41 against the upper side surface 47g of the cam recess 47f.

In addition, in the lens barrel 13, since the rotating load restraining mechanism 70 can prevent the pressure angle (θ) to the cam follower 46b on the lower side surface 47h from increasing in the sharply inclined area Si, an increase in the rotating load (L) due to pressing of the cam follower 46b of the moving frame 46 against the lower side surface 47h of the cam recess 47f can be prevented, and a fluctuation in the rotating load in the rotary barrel 47 can be restrained.

Furthermore, in the lens barrel 13, since the pressure angle (θ) to the cam follower 46b on the lower side surface 47h is prevented from increasing by making the inclination of the lower side surface 47h against which the cam follower 46b is pressed smaller than the upper side surface 47g, a simple configuration can prevent an increase in the rotating load (L) due to the pressing of the cam follower 46b of the moving frame 46 against the lower side surface 47h of the cam recess 47f, thereby enabling to restrain a fluctuation in the rotating load in the rotary barrel 47.

Since the lens barrel 13 prevents the pressure angle (θ) to the cam follower 46b on the lower side surface 47h from increasing by making the inclination on the lower side surface 47h against which the cam follower 46b is pressed unchanging even in the sharply inclined area Si, a simpler configuration can prevent an increase in the rotating load (L) due to the pressing of the cam follower 46b of the moving frame 46 against the lower side surface 47h of the cam recess 47f, thereby being able to restrain a fluctuation in the rotating load in the rotary barrel 47.

In the lens barrel 13, since the same cam recess 47f constructs the upper side surface 47g against which the cam follower 41a of the straight-travel barrel 41 is pressed and the lower side surface 47h against which the cam follower 46b is pressed, the inclination of the lower side surface 47h can be made smaller than the upper side surface 47g simply by adjustment of a width dimension of the cam recess 47f. Thus, a simpler configuration can prevent an increase in the rotating load (L) due to the pressing of the cam follower 46b of the moving frame 46 against the lower side surface 47h of the cam recess 47f, thereby being able to restrain a fluctuation in the rotating load in the rotary barrel 47.

In the lens barrel 13, since the rotating load restraining mechanism 70 can expand the interval in the photographing optical axis direction between the straight-travel barrel 41 and the moving frame 46 which receive force Pp to push in a mutually separate direction from each of the third elastic members 58 in the sharply inclined area Si, the pushing force Pp to the straight-travel barrel 41 and the moving frame 46 to be given by each of the third elastic members 58 can be reduced, in comparison with an area which is on the side of the wide-angle position (wide) at the photographing standby position and which is not the sharply inclined area Si. The pushing force Pp from each of the third elastic members 58, specifically, both the rotating load (L) due to the pressing of the cam follower 41a of the straight-travel barrel 41 against the upper side surface 47g of the cam recess 47f and the rotating load (L) due to the pressing of the cam follower 46b of the moving frame 46 against the lower side surface 47h of the cam recess 47f can be reduced. Thus, a fluctuation in the rotating load in the rotary barrel 47 can be restrained while making it possible to appropriately press the cam follower 41a of the straight-travel barrel 41 against the upper side surface 47g of the cam recess 47f.

In the lens barrel 13, since the rotating load restraining mechanism 70 prevents an increase in the pressure angle (θ) to the cam follower 46b on the lower side surface 47h in the sharply inclined area Si and reduce the pushing force Pp to the straight-travel barrel 41 and the moving frame 46 from each of the third elastic members 58, the cam follower 41a of the straight-travel barrel 41 can be appropriately pressed against the upper side surface 47g of the cam recess 47, an increase in the rotating load (L) due to the pressing of the cam follower 46b of the moving frame 46 against the lower side surface 47h of the cam recess 47f can be prevented, and a fluctuation in the rotating load in the rotary barrel 47 can be restrained more effectively without resulting in an increase in the rotating load.

In the lens barrel 13, since the interval between the straight-travel barrel 41 and the moving frame 46 in the photographing optical axis direction is expanded by widening of the interval between the upper side surface 47g of the cam recess 47f against which the cam follower 41a of the straight-travel barrel 41 is pressed and the lower side surface 47h of the cam recess 47f against which the cam follower 46b of the moving frame 46, a simple configuration can reduce the pushing force PP to the straight-travel barrel 41 and the moving frame 46 to be given by each of the third elastic member 58 than the photographing area PA from the circumferential position P2 to the circumferential position P4 (the area which is not the sharply inclined area Si).

In the lens barrel 13, since the same cam recess 47f constructs the upper side surface 47g against which the cam follower 41a of the straight-travel barrel 41 is pressed and the lower side surface 47h against which the cam follower 46b is pressed, the interval between the straight-travel barrel 41 and the moving frame 46 in the photographing optical axis direction can be expanded by making the inclination of the lower surface 47h against which the cam follower 46b is pressed smaller than the upper side surface 47g, a simpler configuration can reduce the pushing force to the straight-travel barrel 41 and the moving frame 46 to be given by each of the third elastic members 58 than the photographing area PA from the circumferential position P2 to the circumferential position P4 (the area which is not the sharply inclined area Si).

In the lens barrel 13, since the same cam recess 47f constructs the upper side surface 47g against which the cam follower 41a of the straight-travel barrel 41 is pressed and the lower side surface 47h against which the cam follower 46b is pressed, and the cam follower 41a and the cam follower 46b are juxtaposed in the photographing optical axis direction in the inside of the cam recess 47f, the cam recess 47f can be made smaller, and a degree of freedom in layout of each cam recess 47f and the like on the outer peripheral surface of the rotary barrel 47 can be improved.

In the lens barrel 13, since the inclination of the lower side surface 47h is made equal to the upper side surface 47g in the photographing are PA from the circumferential position P2 to the circumferential position P4 (the area which is not the sharply inclined area Si), the interval between the upper side surface 47g and the lower side surface 47h can be made smaller while an increase in the rotating load (L) due to the pushing force Pp in the photographing optical axis direction being given to the straight-travel barrel 41 and the moving frame 46 is restrained. This is because of the following: the inclination of the upper side surface 47g (the lower side surface 47h) is small, specifically, the pressure angle (θ) to the cam follower 41a (the cam follower 46b) is small, in the photographing area PA from the circumferential position P2 to the circumferential position P4 (the area which is not the sharply inclined area Si). Thus, even if the pushing force Pp in the photographing optical axis direction acts as the load F in the photographing optical axis direction in the expression (1), a ratio of the force for rotating the rotary barrel 41 in the pushing force Pp is small, thus an influence of an increase in the rotating load (L) due to the increased pushing force Pp being small.

Since the lens barrel 13 is configured to make the interval between the upper side surface 47g and the lower side surface 47h smaller in the photographing area PA from the circumferential position P2 to the circumferential position P4 (the area which is not the sharply inclined area Si), it can prevent an area occupied by each cam recess 47f on the outer peripheral surface of the rotary barrel 47 from increasing, and form each cam recess 47f, specifically, the upper side surface 47g and the lower side surface 47h by efficiently utilizing the outer peripheral surface of the rotary barrel 47. In other words, since the lens barrel 13 can prevent dimensions of the rotary barrel 47 in the photographing optical axis direction from increasing only to make the interval between the upper side surface 47g and the lower side surface 47h larger, it can contribute to downsizing.

Since the lens barrel 13 is configured to make the interval between the upper side surface 47g and the lower side surface 47h small in the photographing area PA from the circumferential position P2 to the circumferential position P4 (the area which is not the sharply inclined area Si), it can form the upper side surface 47g and the lower side surface 47h by the same cam recess 47f, while making the inclination of the lower side surface 47h smaller than the upper side surface 47g in the sharply inclined area Si.

Since the lens barrel 13 is configured to set inclination and a position of the lower side surface 47h of the cam recess 47 as the moving cam trajectory Tm for movement of the moving frame 46 relative to the upper side surface 47g of the cam recess 47f as the optical cam trajectory To for movement of the straight-travel barrel 41 which retains the first lens group 31 by way of the first retaining frame (not clearly shown), it can restrain changing of the rotating load of the rotary barrel 47 when a position of the movable lens barrel (the straight-travel barrel 41) in the photographing optical axis direction is changed, without affecting the optical design of the photographing optical system 12.

Since the lens barrel 13 sets the inclination and a position of the lower side surface 47h as the moving cam trajectory Tm for movement of the moving frame 46, the amount of spring force of the elastic members (each of the third elastic members 58 in the embodiment) can be optimized in line with the optical cam trajectory To for movement of the straight-travel barrel 41 which retains the first lens group 31 by way of the first lens retaining frame (not clearly shown) defined by the upper side surface 47g of the cam recess 47f.

Each of the third elastic members 58, which is provided between the straight-travel barrel 41 and the moving frame 46, can absorb impact even when the impact due to an external factor such as dropping of the imaging apparatus 10 or collision by other object is given to the tip. Thus, the lens barrel 13 can prevent large load from being applied to the movable lens barrel which operates depending on rotation of the rotary barrel 47 and to the parts to which the operations are transmitted (for example, a part where each cam follower is inserted into each cam groove and the like).

In the lens barrel 13, the end face of the straight-travel barrel 41 on the image surface side in the photographing optical axis direction abuts on the end face of the moving frame 46 in the photographing optical axis direction even when impact due to an external factor such as dropping of the imaging apparatus 10 or collision by other object and the like is given to the tip. Thus, the inclination of the lower side surface 47h can absorb an impact by way of the cam follower 46b of the moving frame 46.

In the lens barrel 13, for example, even when impact due to an external factor such as dropping of the imaging apparatus 10 or collision by other object and the like is given to the tip, the inclination of the upper side surface 47g against which the cam follower 41a of the straight-travel barrel 41 is pressed does not receive the impact, and the inclination of the lower side surface 47h can receive the impact by way of the cam follower 46b of the moving frame 46 on which the straight-travel barrel 41 abuts. Thus, irrespective of rotation profile of the rotary barrel 47, specifically, a position of the movable lens barrel (straight-travel barrel 41) in the photographing optical axis direction, the lens barrel 13 can prevent large load from being applied to the movable lens barrel which operates depending on rotation of the rotary barrel 47 and the parts to which the operations are transmitted (for example, parts where each cam follower is inserted into the each cam follower and the like).

Since the lens barrel 13 can restrain a fluctuation in the rotating load in the rotary barrel 47, specifically, make a range of fluctuations in the rotating load smaller, it can prevent load applied to the driving motor 55a to rotate and drive the rotary barrel 47, stabilize the rotary barrel 47, and make a transition between the wide-angle position (wide) at the photographing standby position and the telephotographic position (tele) smooth.

Since the lens barrel 13 is configured to give the straight-travel barrel 41, which retains the first lens group 31 by way of the first lens retaining frame (not clearly shown), the pushing force Pp with each of the third elastic members 58 provided between the straight-travel barrel 41 and the moving frame 46 which does not retain any optical member of the photographing optical system 12, it can have no backlash (eliminate backlash) between the cam follower 41a of the straight-travel barrel 41 and the upper side surface 47g of the cam recess 47f of the rotary barrel 47 while excessive pushing force is prevented from acting on the retaining member that retains the other optical members (for example the second lens group 32). This is because of the following. In the lens barrel, it is conceivable that through provision of elastic members between two lens retaining members for retaining two adjacent lens groups, the cam follower of each lens retaining member is pressed against one of the cam grooves into which the cam follower is inserted, to improve the accuracy of position of the lens groups as optical members of the photographing optical system (12). However, if elastic members are provided between the lens retaining member whose weight is larger than the other lens retaining members, such as the straight-travel barrel 41 of the embodiment, and the other lens retaining member, the amount of spring force of the elastic members needs to have the size that can give the lens retaining member the pushing force which can appropriately press the cam follower of the lens retaining member having large weight against one side wall section of the cam groove. Then, excessive pushing force is given to other lens retaining members having small weight. Such a difference in weight, mainly a weight (size) difference in lens groups to be retained, has a major effect, like the first lens group 31 and the other lens groups in the embodiment. Often, the first lens group (the lens retaining member for retaining it) located most on the subject side has the largest weight, although this depends on an optical design, and this is most likely in the case of a zoom lens with a variable focal distance. In contrast, in the lens barrel 13 of the embodiment, since each of the third elastic members 58 is provided between the moving frame 46 which does not retain any optical member of the photographing optical system 12 and the straight-travel barrel 41, the lens barrel 13 can improve the accuracy of position of the first lens group 31, while preventing excessive pushing force from being given to the other lens retaining member (for example, the second lens retaining frame 42 for retaining the second lens group 32).

Since the lens barrel 13 gives the straight-travel barrel 41 which retains the first lens group 31 by way of the first lens retaining frame (not clearly shown) the pushing force Pp by each of the third elastic members 58 provided between the straight-travel barrel 41 and the moving frame 46 which does not retain any optical member of the photographing optical system 12, the lens barrel 13 can restrain a fluctuation in the rotating load of the rotary barrel 47, irrespective of a movement aspect of each lens group due to the optical design of the photographing optical system 12.

In the lens barrel 13, since the three first elastic members 56 are provided between the fourth lens retaining frame 44 (the shutter/diaphragm unit 36) and the second lens retaining frame 42, and the second elastic member 57 is provided between the fifth lens retaining frame 45 and the fourth lens retaining frame 44, the accuracy of position of the second lens group 32 (the third lens group 33) retained by the second lens retaining frame 42, the fourth lens group 34 (the shutter/diaphragm unit 36) retained by the fourth lens retaining frame 44, and the fifth lens group 35 retained by the fifth lens retaining frame 45 can be improved. This is because the second lens retaining frame 42 (the second lens group 32 (the third lens group 33)), the fourth lens retaining frame 44 (the fourth lens group 34 (the shutter/diaphragm unit 36)) and the fifth lens retaining frame 45 (the fifth lens group 35) have smaller weight than the straight-travel barrel 41 (the first lens group 31 (the first lens retaining frame (not clearly shown))), and a mutual difference is small compared with a difference in weight with the straight-travel barrel 41.

Since the lens barrel 13 can improve the accuracy of position of all optical members of the photographing optical system 12 (the first lens group 31, the second lens group 32, the third lens group 33, the fourth lens group 34, the shutter/diaphragm unit 36, and the fifth lens group 35), improved images can be obtained.

In the lens barrel 13, in the sharply inclined area Si where the inclination of the upper side surface 47g of the cam recess 47f is large, the rotating load restraining mechanism 70 reduces the rotating load in the rotary barrel 47 due to the pushing force Pp being given by the third elastic members 58 than the other scenes, the lens barrel can prevent the rotating load of the rotary barrel 47 from being excessively large due to provision of each of the third elastic members 58 between the straight-travel barrel 41 and the moving barrel 46, and can restrain an increase in the rotating load of the rotary barrel 47 as a whole, and restrain an increase in torques needed for the driving motor 55a for rotationally driving the rotary barrel 47. Thus, the driving motor 55a can be restrained from getting larger, which can contribute to downsizing of the lens barrel 13, and thus the imaging apparatus 10. In the configuration of the embodiment, this is more effective because weight of the straight-travel barrel 41 (the first lens group 31 (the first lens retaining frame (not clearly shown))) is larger than the other lens retaining members, and thus the amount of spring force needed for the elastic members (each of the third elastic members 58 in the embodiment) increases.

In the lens barrel 13, since each of the third elastic members 58 is provided at a position surrounding the rotary barrel 47 as the moving frame 46 and the elastic members, corresponding to the straight-travel barrel 41 surrounding the rotary barrel 47, a spring design of the elastic members (each of the third elastic members 58) can be facilitated compared with the case in which the elastic members are provided in the inside of the straight-travel barrel 41 (for example, between the straight-travel barrel 41 (the first lens retaining frame (not clearly shown)) and the second lens retaining frame 42).

In the lens barrel 13, since the moving frame 46 is provided on the straight-travel barrel 41 to be movable in the photographing optical axis direction in a predetermined range with respect to the straight-travel barrel 41, and each of the third elastic members 58 as an elastic member is provided between the moving frame 46 and the straight-travel barrel 41, the straight-travel barrel 41 can be a unit supporting the moving frame 46 by way of the third elastic members 58, making the configuration simple and being able to facilitate assembly thereof.

In the lens barrel 13, the frame main body 46a of the moving frame 46 is arranged, as having inside diameter dimension and outside diameter dimension equal to the straight-travel barrel 41 surrounding the rotary barrel 47, on the image surface side of the straight-travel barrel 41 in the photographing optical axis direction, the frame main body 46a surrounds the rotary barrel 47, the moving frame 46 is provided, and each of the third elastic members 58 is provided as an elastic member between the frame main body 46a and the straight-travel barrel 41. Thus, an increase in the dimension in the radial direction can be prevented by provision of the moving frame 46 and each of the third elastic members 58, thereby being able to contribute more to downsizing.

In the imaging apparatus 10 using the lens barrel 13, since the rotating load restraining mechanism 70 can restrain a fluctuation in the rotating load in the rotary barrel 47, a transfer between the wide-angle position (wide) and the telephotographic position (tele) at the photographing standby position can be made smoother and the device as a whole can be downsized.

In the imaging apparatus 10 using the lens barrel 13, since the accuracy of position of all optical members (the first lens group 31, the second lens group 32, the third lens group 33, the fourth lens group 34, the shutter/diaphragm unit 36, and the fifth lens group 35) of the photographing optical system 12 can be improved, a better image can be acquired.

Therefore, the lens barrel 13 according to the present invention can eliminate backlash, while restraining a fluctuation in the rotating load of the rotary barrel 47 due to a change in inclination of the cam groove (the upper side surface 47g of the cam recess 47f).

Note that in the embodiments described above, although one example of the lens barrel according to the present invention has been described, it may be a lens barrel comprising lens retaining members which retains lens groups each including at least one or more lenses as an optical member of the photographing system and in which retaining-side cam followers receiving moving force of the lens groups in the photographing optical axis direction are provided; a moving member which is movable in the optical axis direction within a predetermined range with respect to the lens retaining member and in which moving-side cam followers receiving moving force in the optical axis direction are provided; a rotary barrel which has the retaining-side cam groove into which the retaining-side cam follower is inserted and the moving-side cam groove into which the moving-side cam follower is inserted provided on the peripheral surface and which rotates and thereby gives the lens retaining member the moving force in the optical axis direction, and gives the moving member the moving force in the optical axis direction; elastic members which are provided between the lens retaining member and the moving member and which gives the lens retaining member and the moving member the relatively pushing force in the optical axis direction; and a rotating load restraining mechanism which restrains rotating load in a direction of rotation of the rotary barrel to the lens retaining member with the optical axis as a center of rotation, the rotating load being generated as a result of the elastic members giving the lens retaining members and the moving member the pushing force, wherein the rotating load restraining mechanism may be a lens barrel which reduces the rotating load in the rotary barrel in a sharply inclined area where an angle made by a part on which the retaining-side cam follower in the retaining-side cam groove abuts when viewed in the direction of rotation and a plane orthogonal to the optical axis is large, and the lens barrel is not limited to the embodiments described above.

In addition, in the embodiments described above, although four third elastic members 58, which are compressed coil springs, are used as elastic members to be provided between the straight-travel barrel 41 as the lens retaining member and the moving frame 46, quantities or a configuration thereof may be appropriately set as far as the can give the lens retaining member (the straight-travel barrel 41) and the moving frame 46 the force (Pp) to relatively push in the optical axis direction (photographing optical axis direction). For example, a helical extension spring which shrinks most in unloaded condition and produces elastic force that resists an action of separating one end from the other (causing the pushing force to bring one end close to the other to act) may be used, and the elastic member is not limited to the embodiments described above.

Furthermore, in the embodiments described above, as the rotating load restraining mechanism 70, although the lower side surface 47h is provided as inclination smaller than the upper side surface 47g on the telephotographic side (tele) in the photographing area PA, it may not be limited to the embodiments described above as far as it can reduce the inclination of the moving-side cam groove to prevent the pressure angle ($\theta$) to the moving-side cam follower (the cam follower 46b) of the moving-side cam groove (the lower side surface 47h) from increasing in the sharply inclined area Si where the retaining-side cam groove (the upper side surface 47g) is sharply inclined (the angle made with the plane orthogonal to the photographing optical axis OA is large).

In the embodiment described above, although as the rotating load restraining mechanism 70, the lower side surface 47h is provided at a position to expand the interval with the upper side surface 47g in the photographing optical axis direction on the side of the telephotographic position (tele) in the photographing area PA, it is not limited to the embodiments described above as far as, in the sharply inclined area Si where the retaining-side cam groove (the upper side surface 47g) is sharply inclined (the angle made with the plane orthogonal to the photographing optical axis OA is large), it provides the moving-side cam groove (the lower side surface 47h) at a position which changes the interval with the retaining-side cam groove to reduce the pushing force from the elastic members (each of the third elastic members 58 in the embodiment described above) compared with other areas.

In the embodiment described above, although the upper side surface 47g as the retaining-side cam groove is configured to have larger inclination on the telephotographic position (tele) side in the photographing area PA, depending on an optical design of the photographing optical system, it is also possible that the inclination on the side of the wide-angle position (wide) in the photographing area PA may be larger. In such a case, a configuration may be such that, for example, a helical extension spring is provided as an elastic member at a position similar to each of the third elastic members 58 to give the straight-travel barrel 41 the pushing force to the image surface side in the photographing optical axis direction, thereby not only pressing the cam follower 41a against a side surface on the image surface side in the photographing optical axis direction in the retaining-side cam groove on the outer peripheral surface of the rotary barrel 47 but also giving the moving frame 46 the pushing force to the subject side in the photographing optical axis direction to press the cam follower 46b against a side surface on the subject side in the photographing optical axis direction in the moving-side cam groove on the outer peripheral surface of the rotary barrel 47. In such a configuration, a similar effect to that of the embodiment described above can be achieved by not only reduction of the inclination of the moving-side cam groove (the moving cam trajectory) in the sharply inclined area on the side of the wide-angle position (wide) but also reduction of the interval between the retaining-side cam groove and the moving-side cam groove in the photographing optical axis direction, and a fluctuation in the rotating load of the rotary barrel 47 due to a change in the inclination of the retaining-side cam groove (the optical cam trajectory) can be restrained. With such a configuration, however, the effect of preventing large load from being applied to the movable lens barrel which operates depending on the rotary barrel 47 when impact due to an external factor is given to the tip and on a part to which those operations are transmitted (for example, a part of each cam follower inserted into each cam groove) cannot be achieved.

In the embodiment described above, although the straight-travel barrel 41 surrounding the rotary barrel 47 is the lens retaining member as a target for which the rotating load restraining mechanism 70 reduces the rotating load of the rotary barrel 47 in the sharply inclined area Si, it may be provided in the inside of the rotary barrel 47 as far as it is the lens retaining member for retaining the lens groups (31 to 35 in the embodiments described above) of the photographing optical system 12, and it may not be limited to the embodiments described above. Here, the lens retaining member (the lens group retained thereby), which is the target described above, is preferably one having a large difference in weight from other lens retaining members (the lens group retained thereby).

In the embodiment described above, although the rotary barrel 47 is fitted into the inside of the straight-travel barrel 41 as the lens retaining member, it may have a reverse arrangement order viewed in the radial direction as far as it advances or retracts the lens retaining member (the straight-travel barrel 41) in the photographing optical axis direction through rotation of the rotary barrel 47 and is not limited to the embodiments described above.

In the embodiment described above, although the moving frame 46 is configured not to retain any of the optical member of the photographing optical system 12, the moving frame 46 may retain any of the optical members of the photographing optical system (12) as far as in the sharply inclined area Si where the retaining-side cam groove (the upper side surface 47g) is sharply inclined (the angle made with the plane orthogonal to the photographing optical axis OA is large), it reduces inclination of the moving-side cam groove to prevent the pressure angle (θ) to the moving-side cam follower (the cam follower 46b) of the moving-side cam groove from increasing compared with other areas or provides the moving-side cam groove (the lower side surface 47h) at a position which changes the interval with the retaining-side cam groove to reduce the pushing force from the elastic members (each of the third elastic members 58 in the embodiment described above) compared with other areas, and it is not limited to the embodiments described above.

In the embodiment described above, although lens barrel 13 is shown which is provided in the photographing unit in which the photographing optical system 12 and the imaging device 22 are housed in a casing and the casing is attachable to and detachable from the camera main body 11 (the imaging apparatus 10), the lens barrel provided and configured in the imaging apparatus may be acceptable as far as the retaining-side cam follower of the lens retaining member for retaining the lens groups of the photographing optical system is inserted into the retaining-side cam groove of the rotary barrel and the lens retaining member receives the moving force in the optical axis direction due to rotation of the rotary barrel. It may be a lens barrel in which each barrel part which retains the photographing optical system may be a lens barrel configured to be attachable to and detachable from the casing (the imaging apparatus itself) of the imaging apparatus (digital camera), and is not limited to the embodiments described above.

In the embodiment described above, the imaging apparatus 10 as an example of an imaging apparatus (a digital camera) has the lens barrel 13, it may also be mounted in a PDA (personal data assistant) which incorporates the camera function or a portable information terminal such as a mobile phone and the like and is not limited to the embodiments described above. This is because there are a number of such portable information communications devices having substantially exactly same functions/configuration as the imaging apparatus 10, although appearance slightly differs. Similarly, the lens barrel 13 according to the present invention may be adopted as an image input device.

Although the lens barrel of the present invention has been described so far based on the embodiments, a specific configuration is not limited to the embodiments, and a design change or addition and the like is acceptable unless it departs from the substance of the present invention.

A lens barrel according to the present invention can eliminate backlash while restraining a fluctuation in rotating load of a rotary barrel due to a change in inclination of a cam groove.

What is claimed is:

1. A lens barrel, comprising:
   a lens retaining member which retains a lens group including at least one or more lenses as optical members of a photographing optical system and is provided with a retaining-side cam follower for receiving moving force in an optical axis direction of the lens group;
   a moving member which is movable in the optical axis direction within a predetermined range with respect to the lens retaining member and is provided with a moving-side cam follower for receiving the moving force in the optical axis direction;
   a rotary barrel on a peripheral surface of which a retaining-side cam groove into which the retaining-side cam follower is inserted and a moving-side cam groove into which the moving-side cam follower is inserted are provided, the rotary barrel being configured to rotate, thereby giving the lens retaining member moving force in the optical axis direction and giving the moving member the moving force in the optical axis direction;
   an elastic member which is provided between the lens retaining member and the moving member, and which gives the lens retaining member and the moving member relatively pushing force in the optical axis direction; and
   a rotating load restraining mechanism which restrains rotating load in a direction of rotation of the rotary barrel on the lens retaining member with the optical axis as a center of rotation, the rotating load being generated by the pushing force being given by the elastic body to the lens retaining member and the moving member, wherein the rotating load restraining mechanism is provided with the moving-side cam groove such that the angle made by the part on which the moving-side cam follower abuts and the plane orthogonal to the optical axis is made small, in a sharply inclined area where an angle made by a part on which the retaining-side cam follower abuts in the retaining-side cam groove and a plane orthogonal to the optical axis when viewed in the direction of rotation is large.

2. The lens barrel according to claim 1, wherein in the rotating load restraining mechanism, in the sharply inclined area, reduces the rotating load in the rotary barrel.

3. The lens barrel according to claim 1, wherein in the rotating load restraining mechanism, in the sharply inclined area, the moving-side cam groove is provided such that an interval with the retaining-side cam groove viewed in the optical axis direction is changed so that the elastic member changes an interval with the rotary barrel and the lens retaining member viewed in the optical axis direction to reduce the pushing force to be given to the lens retaining member and the moving member.

4. The lens barrel according to claim 1, wherein
the moving member does not retain any of the optical members of the photographing optical system, and
the moving-side cam groove defines a moving cam trajectory which is independent of an optical cam trajectory for movement of each of the optical members of the photographing optical system.

5. The lens barrel according to claim 1, wherein the pushing force from the elastic member acts in a direction to separate the lens retaining member and the moving member.

6. The lens barrel according to claim 5, wherein
the retaining-side cam groove is formed on a side surface on the side of a subject in a long cam recess provided on a periphery of the rotary barrel,
the moving-side cam groove is formed by a side surface on the side of an image surface in the cam recess, and
the retaining-side cam follower and the moving-side cam follower are provided side by side in the optical axis direction in the cam recess.

7. The lens barrel according to claim 6, wherein when being brought close to each other against the pushing force against the elastic member, the lens retaining member and the moving member abut on each other in the optical axis direction before the retaining-side cam follower reaches the moving-side cam groove.

8. The lens barrel according to claim 1, wherein the pushing force from the elastic member acts in a direction to bring the lens retaining member and the moving member close to each other.

9. An imaging apparatus utilizing the lens barrel according to claim 1.

10. A digital camera utilizing the lens barrel according to claim 1.

* * * * *